United States Patent
Sussman et al.

(10) Patent No.: US 9,147,170 B2
(45) Date of Patent: Sep. 29, 2015

(54) METHODS AND SYSTEMS FOR REDUCING BURST USAGE OF A NETWORKED COMPUTER SYSTEM

(75) Inventors: Adam Sussman, Los Angeles, CA (US); Brendan Ross, Toronto (CA); Bob Bennett, Los Angeles, CA (US); Dennis Denker, Scottsdale, AZ (US); Andrew Karonis, Gibraltar (ES)

(73) Assignee: Live Nation Entertainment, Inc., Beverly Hills, CA (US)

( * ) Notice: Subject to any disclaimer, the term of this patent is extended or adjusted under 35 U.S.C. 154(b) by 98 days.

(21) Appl. No.: 13/462,277

(22) Filed: May 2, 2012

(65) Prior Publication Data
US 2012/0215573 A1    Aug. 23, 2012

Related U.S. Application Data

(62) Division of application No. 11/703,525, filed on Feb. 7, 2007, now Pat. No. 8,176,177.

(60) Provisional application No. 60/771,113, filed on Feb. 7, 2006.

(51) Int. Cl.
*G06Q 10/02* (2012.01)
*H04L 29/08* (2006.01)
*G06F 9/50* (2006.01)
*G06Q 30/06* (2012.01)

(52) U.S. Cl.
CPC *G06Q 10/02* (2013.01); *G06F 9/50* (2013.01); *G06Q 30/0603* (2013.01); *H04L 67/1002* (2013.01); *H04L 67/1008* (2013.01); *H04L 67/1014* (2013.01); *H04L 67/325* (2013.01)

(58) Field of Classification Search
CPC . G06Q 10/02; G06Q 10/025; G06Q 30/0601; G07F 17/42; H04L 67/1029; H04L 67/1002; H04L 67/1008; G06F 9/50
USPC .......................................................... 705/5-6
See application file for complete search history.

(56) References Cited

U.S. PATENT DOCUMENTS 3,581,072 A    5/1971    Nymeyer
3,622,995 A    11/1971    Dilks
(Continued)

FOREIGN PATENT DOCUMENTS

EP    0828223 A2    3/1998
EP    1069539 A2    1/2001
(Continued)

OTHER PUBLICATIONS

Kinberg, et al., Optimal Resource Allocation between Spot and Package Demands, MGMT. Sci., vol. 26, No. 9, 1980, pp. 890-900.*
(Continued)

*Primary Examiner* — Daniel Vetter
(74) *Attorney, Agent, or Firm* — Kilpatrick Townsend & Stockton LLP

(57) ABSTRACT

Methods and systems for reducing burst usage of a networked computer system are described herein. In an embodiment, resource requesters can request, within a time window, resources over a computer network before the resources are available. The resources can then be allocated in batch mode when the resources are available. Thus, resource requests do not have to be processed in real-time, and resource requests can be received before the resources are available.

50 Claims, 7 Drawing Sheets

(56) References Cited

U.S. PATENT DOCUMENTS

| | | |
|---|---|---|
| 4,412,287 A | 10/1983 | Braddock, III |
| 4,603,232 A | 7/1986 | Kurland et al. |
| 4,788,643 A | 11/1988 | Trippe et al. |
| 4,789,928 A | 12/1988 | Fujisaki |
| 4,799,156 A | 1/1989 | Shavit et al. |
| 4,816,904 A | 3/1989 | McKenna et al. |
| 4,845,739 A | 7/1989 | Katz |
| 4,862,357 A | 8/1989 | Ahlstrom et al. |
| 4,889,280 A | 12/1989 | Grald et al. |
| 4,980,826 A | 12/1990 | Wagner |
| 5,077,665 A | 12/1991 | Silverman et al. |
| 5,101,353 A | 3/1992 | Lupien et al. |
| 5,112,050 A | 5/1992 | Koza et al. |
| 5,136,501 A | 8/1992 | Silverman et al. |
| 5,181,786 A | 1/1993 | Hujink |
| 5,237,499 A | 8/1993 | Garback |
| 5,239,480 A | 8/1993 | Huegel |
| 5,253,165 A | 10/1993 | Leiseca et al. |
| 5,265,916 A | 11/1993 | Coe |
| 5,283,734 A | 2/1994 | Von Kohorn |
| 5,311,425 A | 5/1994 | Inada |
| 5,329,589 A | 7/1994 | Fraser et al. |
| 5,333,257 A | 7/1994 | Merrill et al. |
| 5,347,306 A | 9/1994 | Nitta |
| 5,408,417 A | 4/1995 | Wilder |
| 5,422,809 A | 6/1995 | Griffin et al. |
| 5,426,281 A | 6/1995 | Abecassis |
| 5,428,778 A | 6/1995 | Brookes |
| 5,475,585 A | 12/1995 | Bush |
| 5,489,096 A | 2/1996 | Aron |
| 5,496,991 A | 3/1996 | Delfer et al. |
| 5,518,239 A | 5/1996 | Johnston |
| 5,537,684 A | 7/1996 | Cassidy et al. |
| 5,553,145 A | 9/1996 | Micali |
| 5,557,518 A | 9/1996 | Rosen |
| 5,559,707 A | 9/1996 | DeLorme et al. |
| 5,592,375 A | 1/1997 | Salmon et al. |
| 5,598,477 A | 1/1997 | Berson |
| 5,664,115 A | 9/1997 | Fraser |
| 5,684,801 A | 11/1997 | Amitay et al. |
| 5,724,520 A | 3/1998 | Goheen |
| 5,737,363 A | 4/1998 | Dinkins |
| 5,742,763 A | 4/1998 | Jones |
| 5,754,654 A | 5/1998 | Hiroya et al. |
| 5,757,917 A | 5/1998 | Rose et al. |
| 5,774,873 A | 6/1998 | Berent et al. |
| 5,794,207 A | 8/1998 | Walker et al. |
| 5,794,210 A | 8/1998 | Goldhaber et al. |
| 5,794,219 A | 8/1998 | Brown |
| 5,797,126 A | 8/1998 | Helbling et al. |
| 5,812,670 A | 9/1998 | Micali |
| 5,818,914 A | 10/1998 | Fujisaki |
| 5,826,241 A | 10/1998 | Stein et al. |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,890,138 A | 3/1999 | Godin et al. |
| 5,918,209 A | 6/1999 | Campbell et al. |
| 5,930,761 A | 7/1999 | O'Toole |
| 6,023,685 A | 2/2000 | Brett et al. |
| 6,023,686 A | 2/2000 | Brown |
| 6,026,383 A | 2/2000 | Ausubel |
| 6,044,363 A | 3/2000 | Mori et al. |
| 6,047,264 A | 4/2000 | Fisher et al. |
| 6,048,271 A | 4/2000 | Barcelou |
| 6,067,532 A | 5/2000 | Gebb |
| 6,070,146 A | 5/2000 | Mimata |
| 6,082,620 A | 7/2000 | Bone, Jr. |
| 6,085,164 A | 7/2000 | Smith et al. |
| 6,085,169 A | 7/2000 | Walker et al. |
| 6,085,976 A | 7/2000 | Sehr |
| 6,094,640 A | 7/2000 | Goheen |
| 6,107,932 A | 8/2000 | Walker et al. |
| 6,119,096 A | 9/2000 | Mann et al. |
| 6,119,945 A | 9/2000 | Muller et al. |
| 6,175,922 B1 | 1/2001 | Wang et al. |
| 6,192,349 B1 | 2/2001 | Husemann et al. |
| 6,216,227 B1 | 4/2001 | Goldstein et al. |
| 6,223,166 B1 | 4/2001 | Kay |
| 6,230,146 B1 | 5/2001 | Alaia et al. |
| 6,240,396 B1 | 5/2001 | Walker et al. |
| 6,243,691 B1 | 6/2001 | Fisher et al. |
| 6,246,996 B1 | 6/2001 | Stein et al. |
| 6,263,315 B1 | 7/2001 | Talluri |
| 6,308,159 B1 | 10/2001 | Strohl |
| 6,341,353 B1 | 1/2002 | Herman et al. |
| 6,401,147 B1 | 6/2002 | Sang et al. |
| 6,418,415 B1 | 7/2002 | Walker et al. |
| 6,434,398 B1 | 8/2002 | Inselberg |
| 6,442,165 B1 | 8/2002 | Sitaraman et al. |
| 6,446,045 B1 | 9/2002 | Stone et al. |
| 6,446,917 B2 | 9/2002 | Dieckmann et al. |
| 6,449,346 B1 | 9/2002 | Katz |
| 6,466,917 B1 | 10/2002 | Goyal et al. |
| 6,470,451 B1 | 10/2002 | Weinstein |
| 6,477,503 B1 | 11/2002 | Mankes |
| 6,484,153 B1 | 11/2002 | Walker et al. |
| 6,496,809 B1 | 12/2002 | Nakfoor |
| 6,523,037 B1 | 2/2003 | Monahan et al. |
| 6,603,568 B1 | 8/2003 | Sansone |
| 6,604,107 B1 | 8/2003 | Wang |
| 6,606,661 B1 | 8/2003 | Agrawal et al. |
| 6,658,390 B1 | 12/2003 | Walker et al. |
| 6,662,230 B1 | 12/2003 | Eichstaedt et al. |
| 6,679,421 B2 | 1/2004 | Shin et al. |
| 6,685,093 B2 | 2/2004 | Challa et al. |
| 6,690,794 B1 | 2/2004 | Terao et al. |
| 6,704,489 B1 | 3/2004 | Kurauchi et al. |
| 6,704,713 B1 | 3/2004 | Brett et al. |
| 6,736,322 B2 | 5/2004 | Gobburu et al. |
| 6,782,535 B1 | 8/2004 | Dal-Santo et al. |
| 6,820,201 B1 | 11/2004 | Lincoln et al. |
| 6,829,644 B2 | 12/2004 | Aufderheide |
| 6,832,255 B1 | 12/2004 | Rumsewicz et al. |
| 6,842,741 B1 | 1/2005 | Fujimura |
| 6,850,901 B1 | 2/2005 | Hunter et al. |
| 6,853,642 B2 | 2/2005 | Sitaraman et al. |
| 6,854,651 B2 | 2/2005 | Smith et al. |
| 6,859,783 B2 | 2/2005 | Cogger et al. |
| 6,876,974 B1 | 4/2005 | Marsh et al. |
| 6,877,661 B2 | 4/2005 | Webb et al. |
| 6,877,665 B2 | 4/2005 | Gobburu et al. |
| 6,898,472 B2 | 5/2005 | Crampton et al. |
| 6,901,429 B2 | 5/2005 | Dowling |
| 6,907,405 B2 | 6/2005 | Brett |
| 6,910,019 B2 | 6/2005 | Dorr |
| 6,910,627 B1 | 6/2005 | Simpson-Young et al. |
| 6,920,428 B2 | 7/2005 | Greene |
| 6,937,998 B1 | 8/2005 | Swartz et al. |
| 6,944,599 B1 | 9/2005 | Vogel et al. |
| 6,963,854 B1 | 11/2005 | Boyd et al. |
| 6,965,914 B2 | 11/2005 | Dowling |
| 6,999,936 B2 | 2/2006 | Sehr |
| 7,003,485 B1 | 2/2006 | Young |
| 7,004,388 B2 | 2/2006 | Kohta |
| 7,010,494 B2 | 3/2006 | Etzioni et al. |
| 7,031,945 B1 | 4/2006 | Donner |
| 7,044,362 B2 | 5/2006 | Yu |
| 7,058,602 B1 | 6/2006 | La Mura et al. |
| 7,069,243 B2 | 6/2006 | Dinwoodie |
| 7,076,460 B2 | 7/2006 | Dinwoodie |
| 7,080,026 B2 | 7/2006 | Singh et al. |
| 7,080,030 B2 | 7/2006 | Eglen et al. |
| 7,080,328 B1 | 7/2006 | Sawyer |
| 7,080,882 B2 | 7/2006 | Stitt |
| 7,083,081 B2 | 8/2006 | McGee et al. |
| 7,085,818 B2 | 8/2006 | Brown et al. |
| 7,092,892 B1 | 8/2006 | Sobalvarro et al. |
| 7,093,130 B1 | 8/2006 | Kobayashi et al. |
| 7,099,841 B1 | 8/2006 | Hall et al. |
| 7,110,960 B2 | 9/2006 | Phillips et al. |
| 7,114,179 B1 | 9/2006 | Ritter et al. |
| 7,124,062 B2 | 10/2006 | Gebhart |

(56) References Cited

U.S. PATENT DOCUMENTS

| | | |
|---|---|---|
| 7,127,404 B1 | 10/2006 | Poon |
| 7,127,408 B2 | 10/2006 | Rosen |
| 7,133,848 B2 | 11/2006 | Phillips et al. |
| 7,139,916 B2 | 11/2006 | Billingsley et al. |
| 7,149,549 B1 | 12/2006 | Ortiz et al. |
| 7,152,043 B2 | 12/2006 | Alaia et al. |
| 7,162,454 B1 | 1/2007 | Donner et al. |
| 7,191,147 B2 | 3/2007 | Heene et al. |
| 7,328,166 B1 | 2/2008 | Geoghegan et al. |
| 7,333,943 B1 | 2/2008 | Charuk et al. |
| 7,584,123 B1 | 9/2009 | Karonis et al. |
| 7,720,746 B2 | 5/2010 | Brett |
| 7,747,507 B2 | 6/2010 | Brett |
| 7,765,299 B2 | 7/2010 | Romero |
| 7,849,133 B2 | 12/2010 | Denker et al. |
| 7,865,598 B2 | 1/2011 | Denker et al. |
| 7,996,536 B2 | 8/2011 | Denker et al. |
| 8,538,856 B2 | 9/2013 | Brett |
| 2001/0018660 A1 | 8/2001 | Sehr |
| 2001/0034687 A1 | 10/2001 | Bushonville et al. |
| 2001/0049652 A1 | 12/2001 | Nakajima |
| 2002/0004762 A1 | 1/2002 | Izumoto |
| 2002/0023955 A1 | 2/2002 | Frank et al. |
| 2002/0040308 A1 | 4/2002 | Hasegawa et al. |
| 2002/0040346 A1 | 4/2002 | Kwan |
| 2002/0042729 A1 | 4/2002 | Yajima et al. |
| 2002/0052758 A1 | 5/2002 | Arthur et al. |
| 2002/0052965 A1 | 5/2002 | Dowling |
| 2002/0062265 A1 | 5/2002 | Poon |
| 2002/0065763 A1 | 5/2002 | Taylor et al. |
| 2002/0065783 A1 | 5/2002 | Na et al. |
| 2002/0082879 A1 | 6/2002 | Miller et al. |
| 2002/0082969 A1 | 6/2002 | O'Keeffe et al. |
| 2002/0087456 A1 | 7/2002 | Abeshouse et al. |
| 2002/0091555 A1 | 7/2002 | Leppink |
| 2002/0094090 A1 | 7/2002 | Iino |
| 2002/0095357 A1 | 7/2002 | Hunter et al. |
| 2002/0095383 A1 | 7/2002 | Mengin et al. |
| 2002/0099831 A1 | 7/2002 | Tsunogai |
| 2002/0103849 A1 | 8/2002 | Smith |
| 2002/0107779 A1 | 8/2002 | Maltzman |
| 2002/0116343 A1 | 8/2002 | Nakamura et al. |
| 2002/0120492 A1 | 8/2002 | Phillips et al. |
| 2002/0128922 A1 | 9/2002 | Joao |
| 2002/0138325 A1 | 9/2002 | Mashimo et al. |
| 2002/0138751 A1 | 9/2002 | Dutta |
| 2002/0138770 A1 | 9/2002 | Dutta |
| 2002/0138771 A1 | 9/2002 | Dutta |
| 2002/0143860 A1 | 10/2002 | Catan |
| 2002/0156715 A1 | 10/2002 | Wall et al. |
| 2002/0169623 A1 | 11/2002 | Call et al. |
| 2002/0178093 A1 | 11/2002 | Dean et al. |
| 2002/0178226 A1 | 11/2002 | Anderson et al. |
| 2002/0188523 A1 | 12/2002 | Hyyppa et al. |
| 2002/0188551 A1 | 12/2002 | Grove et al. |
| 2003/0023500 A1 | 1/2003 | Boies et al. |
| 2003/0024988 A1 | 2/2003 | Stanard |
| 2003/0040943 A1 | 2/2003 | Bates et al. |
| 2003/0061303 A1 | 3/2003 | Brown et al. |
| 2003/0067464 A1 | 4/2003 | Gathman et al. |
| 2003/0069762 A1 | 4/2003 | Gathman et al. |
| 2003/0069763 A1 | 4/2003 | Gathman et al. |
| 2003/0069764 A1 | 4/2003 | Gathman et al. |
| 2003/0069789 A1 | 4/2003 | Gathman et al. |
| 2003/0069810 A1 | 4/2003 | Gathman et al. |
| 2003/0069827 A1 | 4/2003 | Gathman et al. |
| 2003/0069829 A1 | 4/2003 | Gathman et al. |
| 2003/0093387 A1* | 5/2003 | Nakfoor .................. 705/65 |
| 2003/0099197 A1 | 5/2003 | Yokota et al. |
| 2003/0105641 A1 | 6/2003 | Lewis |
| 2003/0120502 A1 | 6/2003 | Robb et al. |
| 2003/0154142 A1 | 8/2003 | Ginsburg et al. |
| 2003/0154169 A1 | 8/2003 | Yanai |
| 2003/0163373 A1 | 8/2003 | Cornateanu |
| 2003/0164400 A1 | 9/2003 | Boyd |
| 2003/0171960 A1 | 9/2003 | Skinner |
| 2003/0177022 A1 | 9/2003 | Francis |
| 2003/0187802 A1 | 10/2003 | Booth |
| 2003/0208392 A1 | 11/2003 | Shekar et al. |
| 2003/0229790 A1 | 12/2003 | Russell |
| 2003/0236736 A1 | 12/2003 | Harmon et al. |
| 2004/0006497 A1 | 1/2004 | Nestor et al. |
| 2004/0019571 A1 | 1/2004 | Hurwitz et al. |
| 2004/0039635 A1 | 2/2004 | Linde et al. |
| 2004/0039660 A1 | 2/2004 | Prescott |
| 2004/0039696 A1 | 2/2004 | Harmon et al. |
| 2004/0049412 A1 | 3/2004 | Johnson |
| 2004/0073439 A1 | 4/2004 | Shuster |
| 2004/0083156 A1 | 4/2004 | Schulze |
| 2004/0086257 A1 | 5/2004 | Werberig et al. |
| 2004/0093175 A1 | 5/2004 | Tan |
| 2004/0111303 A1 | 6/2004 | Francis |
| 2004/0128257 A1 | 7/2004 | Okamoto et al. |
| 2004/0128516 A1 | 7/2004 | Okamoto et al. |
| 2004/0138962 A1 | 7/2004 | Kopelman et al. |
| 2004/0172270 A1 | 9/2004 | Sugimoto et al. |
| 2004/0181438 A1* | 9/2004 | Hoene et al. .................. 705/5 |
| 2004/0204990 A1 | 10/2004 | Lee et al. |
| 2004/0204991 A1 | 10/2004 | Monahan et al. |
| 2004/0205074 A1 | 10/2004 | Berkery et al. |
| 2004/0215527 A1 | 10/2004 | Grove et al. |
| 2004/0220821 A1 | 11/2004 | Ericsson et al. |
| 2004/0254818 A1 | 12/2004 | Rosen |
| 2005/0001711 A1 | 1/2005 | Doughty et al. |
| 2005/0004818 A1 | 1/2005 | Liman |
| 2005/0015303 A1 | 1/2005 | Dubin et al. |
| 2005/0015308 A1 | 1/2005 | Grove et al. |
| 2005/0021364 A1 | 1/2005 | Nakfoor |
| 2005/0021365 A1 | 1/2005 | Nakfoor |
| 2005/0027608 A1 | 2/2005 | Wiesmuller et al. |
| 2005/0027641 A1 | 2/2005 | Grove et al. |
| 2005/0065866 A1 | 3/2005 | Grove et al. |
| 2005/0071245 A1 | 3/2005 | Norins et al. |
| 2005/0131809 A1 | 6/2005 | Watt, II et al. |
| 2005/0139661 A1 | 6/2005 | Eglen et al. |
| 2005/0139662 A1 | 6/2005 | Eglen et al. |
| 2005/0140675 A1 | 6/2005 | Billingsley et al. |
| 2005/0144115 A1 | 6/2005 | Brett |
| 2005/0149458 A1 | 7/2005 | Eglen et al. |
| 2005/0160020 A1 | 7/2005 | Asher et al. |
| 2005/0165758 A1 | 7/2005 | Kasten et al. |
| 2005/0209954 A1 | 9/2005 | Asher et al. |
| 2005/0228722 A1 | 10/2005 | Embree |
| 2005/0240453 A1 | 10/2005 | Lyons |
| 2005/0273405 A1 | 12/2005 | Chen |
| 2005/0286532 A1 | 12/2005 | Mengerink |
| 2006/0017541 A1 | 1/2006 | Nguyen |
| 2006/0069780 A1 | 3/2006 | Batni et al. |
| 2006/0085396 A1 | 4/2006 | Evans et al. |
| 2006/0095344 A1 | 5/2006 | Nakfoor |
| 2006/0100985 A1 | 5/2006 | Mark et al. |
| 2006/0105783 A1 | 5/2006 | Giraldin et al. |
| 2006/0108418 A1 | 5/2006 | Rice |
| 2006/0111967 A1 | 5/2006 | Forbes |
| 2006/0116916 A1 | 6/2006 | Bowman et al. |
| 2006/0124734 A1 | 6/2006 | Wallerstorfer et al. |
| 2006/0126201 A1 | 6/2006 | Jain |
| 2006/0140374 A1 | 6/2006 | Light et al. |
| 2006/0143094 A1 | 6/2006 | Kohout et al. |
| 2006/0143109 A1 | 6/2006 | Goel |
| 2006/0143698 A1 | 6/2006 | Ohara |
| 2006/0144946 A1 | 7/2006 | Kuriyama et al. |
| 2006/0148566 A1 | 7/2006 | Lakshminarasimha |
| 2006/0155659 A1 | 7/2006 | DiCesare |
| 2006/0155857 A1 | 7/2006 | Feenan et al. |
| 2006/0167756 A1 | 7/2006 | VonBergen et al. |
| 2006/0178930 A1 | 8/2006 | Kim |
| 2006/0190387 A1 | 8/2006 | Molloy |
| 2006/0190388 A1 | 8/2006 | Molloy |
| 2006/0190389 A1 | 8/2006 | Molloy |
| 2006/0190390 A1 | 8/2006 | Molloy |
| 2006/0195356 A1 | 8/2006 | Nerenhausen et al. |
| 2006/0232110 A1 | 10/2006 | Ovadia |
| 2006/0244564 A1 | 11/2006 | Madsen |

(56) References Cited

U.S. PATENT DOCUMENTS

| | | | |
|---|---|---|---|
| 2006/0249572 | A1 | 11/2006 | Chen et al. |
| 2006/0271462 | A1 | 11/2006 | Harmon |
| 2006/0277130 | A1 | 12/2006 | Harmon |
| 2006/0293929 | A1 | 12/2006 | Wu et al. |
| 2006/0293994 | A1 | 12/2006 | Stuart |
| 2007/0012765 | A1 | 1/2007 | Trinquet et al. |
| 2007/0017979 | A1 | 1/2007 | Wu et al. |
| 2007/0055554 | A1 | 3/2007 | Sussman et al. |
| 2007/0130022 | A1 | 6/2007 | Prescott |
| 2008/0021998 | A1 | 1/2008 | Wentink |
| 2008/0243838 | A1 | 10/2008 | Scott et al. |

FOREIGN PATENT DOCUMENTS

| | | |
|---|---|---|
| JP | 5266049 | 10/1993 |
| JP | 11031204 A | 2/1999 |
| JP | 2001236459 A | 8/2001 |
| WO | WO 88-03295 | 5/1988 |
| WO | WO 98-10361 | 3/1998 |
| WO | WO 99-06928 | 2/1999 |
| WO | WO 99-18533 | 4/1999 |
| WO | WO 99-38129 | 7/1999 |
| WO | WO 99-60489 | 11/1999 |
| WO | WO 00-62260 | 10/2000 |
| WO | WO 00-74300 | 12/2000 |
| WO | WO 00-75838 | 12/2000 |
| WO | WO 01-03040 | 1/2001 |
| WO | WO 01-08065 | 2/2001 |
| WO | WO 01-41021 | 6/2001 |
| WO | WO 01-41085 | 6/2001 |
| WO | WO 01-44892 | 6/2001 |
| WO | WO 01-52139 | 7/2001 |
| WO | WO 01-59649 | 8/2001 |
| WO | WO 01-59658 | 8/2001 |
| WO | WO 01-71669 | 9/2001 |
| WO | WO 01-84473 | 11/2001 |
| WO | WO 02-03171 | 1/2002 |
| WO | WO 02-03174 | 1/2002 |
| WO | WO 02-35322 | 5/2002 |
| WO | WO 03-027808 | 4/2003 |

OTHER PUBLICATIONS

Happel, et al., Creating a Futures Market for Major Event Tickets: Problems and Prospects, CATO J., vol. 21, No. 3, 2002, pp. 443-462.*
"Acteva and Enspot.com Sign Agreement to Provide On-Line Ticketing, Broader Distribution", Business Wire (Dec. 3, 1999).
"AuctionNet Still One-Of-A-Kind", Automotive News, S12 (Sep. 20, 1993).
"Cathay Pacific Airways Auctions a Boeing 747-400 Worth of Seats in Third Cybertraveler Auction", Business Wire (Apr. 29, 1996).
"Cathay Pacific Airways-USA Receives More than 1,300 Bids During First Five Days of CyberAuction", Business Wire (Oct. 18, 1995).
"Cathay Pacific Airways-USA to Hold First-Ever Internet CyberAuction", Business Wire (Sep. 26, 1995).
"E-TicketBoard Launches PSL Xchange for Eight NFL Teams", PR Newswire (Jul. 18, 2000).
"E-TicketBoard Launches Revolutionary New Site—SeatsandSuites", PR Newswire (Oct. 17, 2000).
"Keyware Unveils Multi-Application Smart Card Suite", Card News, vol. 16, No. 10 (May 30, 2001).
"Online Movie Ticket Site Launched in China", China Online (Dec. 23, 1999).
"OnSale Brings Thrill of the Auction to the Web", Link-up p. 34 (Jul.-Aug. 1995).
"Season Ticket Solutions Announces Availability of Ticket Exchange for Sporting Teams and Entertainment Venues", Business Wire (Jul. 30, 2001).
"WBGH to Hold Online Computer Auction", Link-Up, p. 10 (Sep.-Oct. 1988).
Article from Smart Card News, "Major Players Form Proton World International," Aug. 1998, pp. 141-160.

Asokan et al., "Semper Consortium: Advanced Services, Architecture and Design," Deliverable D10 of ACTS Project AC026, Mar. 15, 1999.
Banâtre, "Distributed Auction Bidding System", International Computing Symposium, vol. 4, No. 4 (Aug. 1981).
Banks, "PSL Put Owners on the Hot Seat", St. Petersburg Times, p. 10C (Oct. 31, 1993).
Beam et al, "Electronic Negotiation through Internet-Based Auctions", CITM Working Paper 96-WP-1019, http:--haas.berkeley.edu-citm-publications-papers-wp-1019.pdf (Dec. 1996).
Blau, "Dormitories See Departure from Previous Years' Trends", The Tech, vol. 116, No. 38 (Aug. 30, 1996).
Boyes et al, "Auctions as an Allocation Mechanism in Academia: The Case of Faculty Offices", Journal of Economic Perspectives, vol. 3, No. 3, pp. 37-40 (Summer 1989).
Chui et al., "Auction on the Internet—A Preliminary Study," Department of Marketing, HK University of Science and Technology, 1999, pp. 1-7.
Collier, "Columbia, S.C.-Based Internet Firm Helps Buy, Sell Sports Tickets", The State, (Oct. 23, 2000).
Application No. 09-702,794, filed Nov. 1, 2000.
Dickey, "Raider PSL Without Permanent Place", San Francisco Chronicle, p. B2 (Jun. 26, 1997).
Dickey, "Raiders' PSLs May Be for Life", San Francisco Chronicle, p. D5 (Mar. 26, 1997).
Fujimura et al., "Digital-Ticket-Controlled Digital Ticket Circulation," NTT Information Sharing Platform Laboratories, Usenix Security Symposium, Aug. 23-26, 1999.
Fujimura et al., "General-purpose Digital Ticket Framework," NTT Information and Communication Systems Labs, USENIX Workshop on Electronic Commerce, Aug. 31-Sep. 1998.
Fujimura, "XML Ticket: Generalized Digital Ticket Definition Language," the W3C Signed XML Workshop—Copyright © 1999, 33 pages.
Garza, "Space Cruise", Reason (May 2000).
Happel, "Creating a Futures Market for Major Event Tickets: Problems and Prospects", Cato Journal, vol. 21, No. 3 (Winter 2002).
Harlan, "At Least it isn't the Team's Ball that's in Somebody Else's Court", Wall Street Journal (Jun. 4, 1991).
Hes et al., "At Face Value" on biometrical identification and privacy, Registratiekamer, Sep. 1999, 78 pages.
Holbrook, "Oakland, Calif., Professional Football Team Sees Gain in Seat License Sales", Contra Costa Times (Feb. 26, 2001).
Hylton, "Dorm Lottery Starts Strong", The Tech, vol. 114, No. 34 (Aug. 29, 1994).
In, Shirley Siu Weng, "A Proposed Electronic Ticket Management for Trading Service in Internet," Feb. 9, 2001, 7 pages.
Jackson, "Media Futures: This Bazaar Could Put Retailers Under the Hammer", Financial Times (May 25, 1995).
Jenkins, "Giants Draw Fans into Web Team Helps Season—Ticket Holders Get Mileage Out of Plans", USA Today, p. 3C (Jun. 27, 2000).
Kasper, "Purchase Griz Playoff Tickets Now", Missoulian Online (May 3, 2001).
Koenig, "Texas Firm Links Sports Teams, Fans", Amarillo Globe-News, Feb. 20, 2000).
Kravets, "Going, Going, Gone! Real Estate Auctions in the 90s", Probate & Property, p. 38 (May-Jun. 1993).
Kroll et al, "The Commodity Futures Market Guide", Harper and Row, pp. 9-10 (1973).
Kumar, "With Stars in their Eyes, Travelers Look to Space", St. Petersburg Times, p. 1A (Jun. 11, 2000).
Labuszewski et al, "Inside the Commodity Option Markets", John Wiley & Sons, pp. 19-21 (1985).
Liao, "Sloan's Class Priority System Set to Go", The Tech, vol. 116, No. 25 (May 10, 1996).
Martin, "LiquidSeats Helps Fill the House, Sans Scalping" cnn.com, (Dec. 14, 2000).
Matsumoto et al, "Feasibility of Space Tourism 'Cost Study for Space Tour'", Proceedings of 40th IAF Congress, Paper IAF-89-700 (1989).
Matsuyama et al., "Distributed Digital-Ticket Management for Rights Trading System," E-Commerce, 1999; pp. 110-118.

(56) References Cited

OTHER PUBLICATIONS

Menezes et al, "Simultaneous Pooled Auctions", The Journal of Real Estate Finance and Economics, vol. 17(3), pp. 219-232 (Nov. 19, 1996).
Moldovanu et al, "The Optimal Allocation of Prizes in Contests", http:--www.sfb504.uni-mannheim.de-publications-dp99-75.pdf (Jul. 14, 1999).
Nestor et al, "Transforming Tickets from a Commodity into a Valuable Strategic Asset", Global eTicket Exchange whitepaper, Oct. 13, 2000.
Office Action mailed on Aug. 2, 2007 in U.S. Appl. No. 11/453,286.
Office Action mailed on Jul. 27, 2007 in U.S. Appl. No. 11/475,733.
O'Neil, "Q and A", St. Louis Post-Dispatch, p. 4D (Jan. 19, 1995).
PCT International Search Report and Written Opinion dated Feb. 14, 2008; (International Application No. PCT-US07-03082, filed Feb. 6, 2007).
Riley et al, "Optimal Auctions", The American Economic Review, vol. 71, No. 3, pp. 381-392 (Jun. 1981).
Rosen et al, "Ticket Pricing", University of Chicago Center for the Study of the Economy and the State (Sep. 1995).
Rubel, "ETM to Ticketmaster: Let's Rock", Marketing News (Jun. 19, 1995).
Stevenson, "Frosh Get at Least Fifth Choice Dorm: Women Find Shortage of Single-Sex Rooms", The Tech, vol. 115, No. 37 (Aug. 31, 1995).
Thomas, "Deadline Looms for Playoff Tickets; PSL Owners Have Until Dec. 8 to Make Purchase", St. Louis Post-Dispatch, p. D8 (Dec. 3, 1999).
Vanderporten, "Strategic Behavior in Pooled Condominium Auctions", Journal of Urban Economics 31, pp. 123-137 (1992).
Waddell, "Advantix, Tickets.com Hope Merger Brings Best of Both Ticketing Worlds", Amusement Business (Feb. 8, 1999).
Wagner, "How Retailers are Using Web Auctions to Let Customers Help Them Set Prices", http:--www.internetretailer.com-printArticle.asp?id=3164 (Mar. 2001).
www.SeasonTicket.com Web Pages, as retrieved from archive.org (2001).
www.TicketOptions.com Web Pages, as retrieved from archive.org (2001).
Zoltak, "Advantix Acquisitions Continue with Protix Deal", Amusement Business (Nov. 2, 1998).
U.S. Appl. No. 11/059,990, Non-Final Office Action mailed on Aug. 11, 2008, 46 pages.
U.S. Appl. No. 11/059,990, Non-Final Office Action mailed on Jun. 12, 2009, 9 pages.
U.S. Appl. No. 11/059,990, Notice of Allowance mailed on Feb. 22, 2010, 6 pages.
U.S. Appl. No. 12/187,295, Non-Final Office Action mailed on Apr. 13, 2010, 21 pages.
U.S. Appl. No. 12/187,295, Notice of Allowance mailed on Sep. 2, 2010, 8 pages.
U.S. Appl. No. 12/758,437, Non-Final Office Action mailed on Sep. 24, 2012, 26 pages.
U.S. Appl. No. 12/758,437, Final Office Action mailed on Mar. 25, 2013, 6 pages.
U.S. Appl. No. 12/758,437, Notice of Allowance mailed on May 20, 2013, 9 pages.
U.S. Appl. No. 12/955,783, Notice of Allowance mailed on Apr. 4, 2011, 17 pages.
U.S. Appl. No. 12/955,783, Notice of Allowance mailed on Jun. 20, 2011, 15 pages.

\* cited by examiner

FIG. 4

Select Delivery Method
A processing fee per order is applied in addition to the delivery price per order listed below.

Deliver My Tickets    Price Per Order    Please Note
US Customers
- ticketFast: NOW (Recommended)    US $2.50   The quickest delivery method available. Tickets delivered via email, you print them out!
- UPS: 2-Business Day Morning    US $19.50         by 12 noon in 2 business days-undeliveralbe to PO Box addresses
- UPS: 2-Business Day Evening    US $18.50         by 7:30 pm in 2 business days-undeliverable to PO Box addresses
- UPS: 3-Business Day Evening    US $14.50         bt 7:30 pm in 3 business days- undeliverable to PO Box addresses
- UPS: Saturday    US $25.00   by noon on Saturday.
- Will Call   No additional charge   Tickets held at Will Call can be retrieved by the cardholder with original credit card of purchase and a valid photo ID with signature such as a state ID, driver's license or passport.

*FIG. 5*

METHODS AND SYSTEMS FOR REDUCING BURST USAGE OF A NETWORKED COMPUTER SYSTEM

CROSS-REFERENCE TO RELATED APPLICATIONS

The application is divisional of U.S. application Ser. No. 11/703,525, filed Feb. 7, 2007, which claims priority from U.S. Patent Application No. 60/771,113, filed Feb. 7, 2006, the contents of which are incorporated herein in their entirety.

A portion of the disclosure of this patent document contains material that is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

BACKGROUND OF THE INVENTION

1. Field of the Invention

The present invention relates to methods and systems for allocating resources via a network, and in particular, to methods and systems for reducing peak usage of a networked computer system.

2. Description of the Related Art

Networked computer systems tend to be designed to handle peak loads, such as those that may be encountered during prime hours, to avoid system crashes and overly lengthy response times. However, having a networked computer system configured to handle peak or burst loads often requires expensive infrastructure, and may result in certain system resources, such as processors, memory, and/or network bandwidth, being underutilized for significant periods of time.

SUMMARY OF THE INVENTION

The present invention relates to methods and systems for allocating resources via a network, and in particular, to methods and systems for reducing peak usage of a networked computer system.

An example embodiment provides a method of reducing burst usage in a networked computer system, the method comprising: transmitting over a network to a plurality of computers information regarding a future first time period when resource requests for a first set of resources will be accepted, wherein resources in the first set of resources are not allocated during the first time period; receiving a plurality of resource requests from a plurality of requesters during the first period of time, wherein the plurality of resource requests are received over the network, wherein the plurality of resource requests include a request from a first of the resource requesters for a preferred resource and an indication as to whether an alternate resource different than the preferred resource would be acceptable; during a second time period beginning after the first time period ends, processing the plurality of resource requests in batch mode using a processing system, the processing further comprising: ranking the plurality of resource requests based on one or more of the following criteria: corresponding locations for some or all of the resource requesters; history of resource requests for some or all of the resource requesters; allocating resources to at least a portion of the plurality requesters based at least in part on corresponding resource request rankings and availability of requested resources; transmitting a communication over the network to one or more requesters receiving an allocation, the communication providing information regarding the corresponding allocation; allocating the alternate resource to the first requester if the first requester indicated a willingness to accept the alternate resource, was not allocated the preferred resource, and if the alternate resource is available to be allocated to the first requester; and transmitting a communication over the network regarding the alternate resource allocation to the first requester.

Another example embodiment provides a method of allocating resources in batch mode via a computer system, the method comprising: transmitting over a network to a plurality of terminals information regarding a future first time period when resource requests for a first set of resources will be accepted but will not be allocated; receiving a plurality of resource requests over the network from a plurality of requesters during the first period of time; ranking the plurality of resource requests based on one or more of the following criteria: location of one or more resource requesters; historical transaction frequency of one or more resource requesters; quantity of previous resource allocations to one or more resource requesters; historical transaction value of resource allocations to one or more resource requesters; information related to reallocation of resources by one or more resource requesters to others; a quantity of resources currently being requested by one or more resource requesters; whether a number of resources currently being requested by one or more resource requesters is an odd or even number of resources; preferred membership status of one or more resource requesters; during a second period of time, allocating resources using a processing system to at least a portion of the plurality requesters based at least in part on corresponding resource request rankings; and transmitting a communication over the network to at least one requester allocated a requested resource, the communication including a notification regarding the requested resource allocation.

Another example embodiment provides a method of performing delayed allocations of tickets via a computer system, the method comprising: transmitting over a network to a first terminal associated with a user information regarding a first time period when ticket requests for a first event will be accepted, wherein a ticket for the first event provides one or more people with event access; receiving a first plurality of ticket requests over the network from a first plurality of users during the first period of time; processing the first plurality of ticket requests using a processing system during a second time period, wherein the second time period begins after the first plurality of ticket requests has been received; ranking the first plurality of ticket requests based on one or more of the following criteria: a location of one or more users requesting tickets; historical transaction frequency with respect to ticket purchases of one or more users requesting tickets; quantity of previous tickets purchased by one or more users requesting tickets; value of ticket purchases made by one or more users requesting tickets; information related to a resale of tickets by one or more users requesting tickets; the quantity of event seating currently being requested by one or more users requesting tickets; whether one or more users is requesting an odd number of event seats; preferred membership status of one or more users requesting tickets; allocating tickets to at least a portion of the plurality users based at least in part on corresponding ticket request rankings; and transmitting a communication to one or more users allocated a requested ticket.

An example embodiment provides a method of performing allocations of tickets via a computer system, the method comprising: receiving a first plurality of ticket requests over the network from a first plurality of users during the first period of time; ranking the first plurality of ticket requests based on one or more of the following criteria: a location of one or more users requesting tickets; historical transaction frequency with respect to ticket purchases of one or more users requesting tickets; quantity of previous tickets purchased by one or more users requesting tickets; value of ticket purchases made by one or more users requesting tickets; information related to a resale of tickets by one or more users requesting tickets; allocating tickets to at least a portion of the plurality users based at least in part on corresponding ticket request rankings; and transmitting a communication to one or more users allocated a requested ticket.

BRIEF DESCRIPTION OF THE DRAWINGS

Embodiments of the present invention will now be described with reference to the drawings summarized below. These drawings and the associated description are provided to illustrate example embodiments of the invention, and not to limit the scope of the invention.

FIG. 4 illustrates an example resource preference user interface.

FIG. 5 illustrates an example delivery specification user interface.

DETAILED DESCRIPTION OF PREFERRED EMBODIMENTS

Figures 1, 1A:
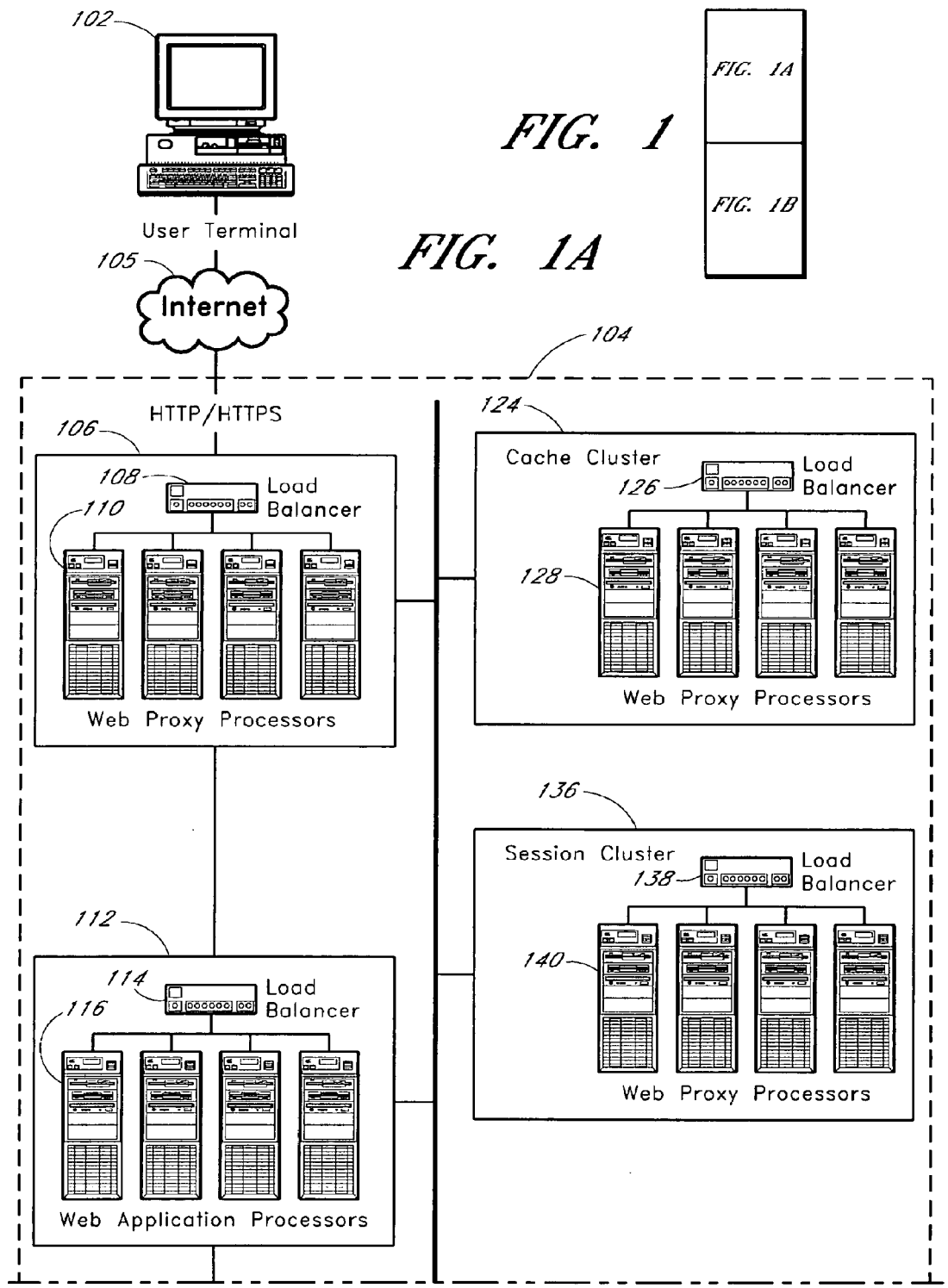
FIG. 1, including
FIGS. 1A-B, illustrates an example system embodiment that can be used in conjunction with the processes described herein.

The present invention relates to methods and systems for allocating resources via a network, and in particular, is related to methods and systems for reducing peak usage of a networked computer system.

As will be described in greater detail below, an online system accepts resource order submissions over a network during a window of time and then closes that window. Rather than assigning resources (e.g., inventory, such as event tickets) to orders in real time, resource requests are made prior to resource availability, and resources are then optionally assigned in a batch mode. Thus, in an example embodiment, a presale can be conducted, wherein users submit purchase requests, and optionally users are not assured or guaranteed they will receive the requested inventory until the allocation process has been performed.

By way of illustrative example, after the submission window has closed, inventory is selectively assigned to orders submitted within the window based on one or more criteria. For example, inventory assignment can be based on (i) a random allocation of inventory to requesting users, (ii) allocating inventory based on a user's transaction frequency and/or amount (e.g., based on how often the user purchases inventory, the amount of inventory the user has purchased in the past, the total dollar value of inventory purchased by the user, and/or based on how recently the user purchased inventory, etc.) (iii) low amount of tickets ordered (e.g., allocating inventory based on how an infrequent a user the user is), (iv) past resale activity by user (e.g., how recently and/or how often the user has resold inventory previously purchased, such as that originally sold, then resold and tracked via a ticket system), (v) the price offered by the user for the inventory, (vi) seat location preferences, where the inventory is related to seats (e.g., seats at a concert, sporting event, an airplane, etc.), (vii) the amount of inventory the user is currently requesting (e.g., how many seat tickets), (viii) whether the user is currently requesting an odd or an even amount of inventory, (ix) whether the user has indicated that the user is willing to accept alternate inventory (e.g., tickets for other event performances); (x) how to increase or maximize total inventory sales (e.g., how to reduce the number of empty seats for an event using seat packing); (xi) whether the user has a preferred membership (e.g., which may be obtained by paying a fee or by being subscriber of a selected other service, such as of a certain credit or charge card service); and/or (xii) other criteria.

Optionally, the allocation of inventory to order submissions within the submission (e.g., presale) window is not based on the date or timing of the submission within that window (e.g., allocations are optionally not made on a first come first serve basis). This enables humans and machines to better compete for inventory fairly, rather than solely on how quickly users submitted purchase requests within the submission window. Optionally, the allocation process described herein provides demand information to help determine whether to acquire or create additional inventory or whether to adjust inventory pricing.

The processes and systems described herein can provide an enhanced technique for allocating inventory (e.g., tickets), that is in high demand to accomplish certain distribution, allocation, and/or pricing goals. In addition, utilization of the processes and systems described herein can reduce the needed ticket system infrastructure by reducing burst loads on the system.

Throughout the following description, the term "Web site" is used to refer to a user-accessible server site that implements the basic World Wide Web standards for the coding and transmission of hypertextual documents. These standards currently include HTML (the Hypertext Markup Language), which can be used to generate Web pages, and HTTP (the Hypertext Transfer Protocol). It should be understood that the term "site" or "computer system" are not intended to imply a single geographic location, as a Web or other network site can, for example, include multiple geographically-distributed computer systems that are appropriately linked together. Furthermore, while the following description relates to an embodiment utilizing the Internet and related protocols, other networks, such as networked interactive televisions and wireless phones, and other protocols, may be used as well.

In addition, unless otherwise indicated, the functions described herein may be performed by software modules including executable code and instructions running on one or more general-purpose computers. The computers can include one or more central processing units (CPUs) that execute program code and process data, memory, including one or more of volatile memory, such as random access memory (RAM) for temporarily storing data and data structures during program execution, non-volatile memory, such as a hard disc drive, optical drive, or FLASH drive, for storing programs and data, including databases, which may be referred to as a "system database," and a wired and/or wireless network interface for accessing an intranet and/or Internet.

In addition, the computers can include a display for displaying user interfaces, data, and the like, and one or more user input devices, such as a keyboard, mouse, pointing device, microphone and/or the like, used to navigate, provide commands, enter information, provide search queries, and/or the like. However, the systems described herein can also be implemented using special purpose computers, terminals, state machines, and/or hardwired electronic circuits.

Further, the example processes described herein do not necessarily have to be performed in the described sequence, and not all states have to be reached or performed. In addition, certain process states that are illustrated or described as being serially performed herein, can be performed in parallel.

While the following discussion may often relate to tickets (e.g., a voucher to indicate that one has paid for or is entitled to admission to a theatre, concert, amusement park, zoo, aquarium, museum, concert, or other attraction, or entitled to travel on an airplane, public transit, train, or other mode of transportation) in order to illustrate the use and application of the disclosed systems and methods, the disclosed systems and methods can be applied to other types of units, inventory, or finite resources, such as products or other priority rights.

A significant problem posed with respect to the allocation of finite resources via a networked computer based system, where the demand is greater than the supply, is that large numbers of users will often attempt to access, within a relatively brief amount of time, the computer system allocating the finite resource. Often, this results in peak or burst loads on the allocating computer system and network that exceed the available bandwidth of the allocating computer system and/or network. This can result in bottlenecks and user access blockages.

Conventionally, in order to accommodate such peak and burst loads, the allocating computer system operator needs to configure the computer system (e.g., via additional servers, higher speed intranets, etc.) to handle peak loads that are often far in excess of the typical load. Similarly, the operator may need to lease or acquire higher speed or additional network lines in order to handle the peak load, as will need to lease or acquire the corresponding hardware (modems, switches, routers, etc.) to interface to the network lines. The foregoing approach results in higher system acquisition, lease and maintenance costs.

A nonlimiting example of a finite resource that may be allocated via an online computer system are event tickets. For example, the event tickets may be for a sporting event, a concert, a show, a movie, or for other entertainment events at a given venue. By way of further example, the finite resource may be for a plane ticket (e.g., a regular ticket or a ticket acquired with frequent flier miles), or for a right to buy a product offered in limited amounts.

Thus, for example, if an online ticket system is selling tickets for a highly popular event (e.g., the Super bowl, a Rolling Stones concert, opening day at an amusement park, etc.), at a large venue (e.g., seating 60,000 people), or with many performances at a venue with relatively fewer seats (e.g., a play having 100 scheduled performances at a venue with 1500 seats), then as soon as the tickets are put on sale, the online ticket system will often experience a burst of online users attempting to purchase tickets via the agency website in a relatively short period of time. Such a burst load can overwhelm the ticket system, resulting in user access blockages.

An example online purchase process may include some or all of the following acts: providing the user over a network (e.g., the Internet) an event selection form, receiving the user event selection via the form; providing the user with a ticket request form; receiving the user ticket request criteria (e.g., number of tickets, price range, seat section, etc.); verifying that the user request complies with ticket purchase guidelines (e.g., does not exceed a specified maximum number of tickets); providing over the network a form used to better ensure that an automated program (e.g., a software robot) is not being used to purchase the ticket (e.g., by presenting a word that the user needs to type into a field); verifying that the user correctly completed the form; determining what are the available seats that meet the user's criteria; providing, over the network, the user with a listing of the seats being temporarily reserved for the user pending the user's purchase; providing over the network a ticket delivery instruction form; receiving or the network user ticket delivery instructions; receiving user registration information (e.g., name, contact information (such as street addresses, city, state, zip code, email address, phone number, instant messaging identifier, etc.) desired password, etc.) or account log in information (e.g., a password and/or a user identifier); receiving over the network payment information (e.g., credit card number and expiration date); verifying the payment information, processing the issuance of the ordered tickets; and send a purchase confirmation to the user (e.g., via a Web page, an email, and/or an SMS message). In addition, the online ticket system has to determine when a user has abandoned a purchase process (e.g., by determining if the user failed to complete a purchase process step within a designated period of time), and then has to release tickets reserved for that user so that other users can purchase the tickets.

If the ticket system has to successfully perform that above process for thousands of users within a short period of time (e.g., within 15 or 30 minutes), the ticket system will need an expensive backend infrastructure and high bandwidth access to the Internet.

In one embodiment, in order to reduce the peak or burst loads on the ticket system, and hence, to correspondingly optionally reduce the needed ticket system bandwidth, rather than just taking purchase requests for tickets when the tickets are actually available for sale, a presale process is provided. As will be discussed in greater detail, users can request tickets before the tickets actually go on sale. Once the tickets are put on sale, users can be randomly selected (e.g., the date and time of the presale user ticket request during the presale window does not affect the quality or quantity of tickets they will allocated) by the ticket system to receive tickets that meet the corresponding user ticket criteria and other criteria.

Optionally, the actual ticket allocation can be performed in a batch mode, and the timing of the allocation process can be selected so that it is performed when the ticket system is not otherwise heavily loaded (e.g., between 2:00 AM and 3:00 AM). Hence, rather than allocating the best ticket to the first user to request a ticket, the second best ticket to the second user to request a ticket, and so on, in a first come first serve manner, the order in which users made presale requests for a given set of tickets (e.g., tickets for a particular event or section) will not correspond or not have a one-to-one correspondence to the order in which tickets are allocated.

Because, for example, if a user who requests a ticket two weeks after the start of a presale has the same chance of being allocated a given ticket as a user who requests a ticket on the presale start date, there will be significantly less motivation on the part of users to rush to request tickets on the presale start date. Instead, online ticket requests to the ticket system are likely to be more evenly distributed over the presale period, rather than be heavily front loaded during the start of the sale. Hence, optionally, the ticket system infrastructure can be comparatively reduced.

In addition, there will likely be less motivation for certain users to use automated programs to reserve seats, as there will not be a benefit to being an early ticket requester. Users may view the foregoing allocation process as being more fair, as users are not placed at a disadvantage just because they did not have access to a computer (to request tickets) at the time the sale or presale began.

Optionally, when the actual sale starts, tickets that have not been allocated to presale requesters (e.g., if the number of requested tickets is less than the available number of tickets, or if some tickets were not offered to presale requesters) can be sold on a first come first serve basis, or on other basis.

The following is an illustrative example process. A determination is made as to when a presale should begin for a given event. The start and end of the presale period may be consistent for a given type of event. For example, if the event is a rock or pop concert, the presale period may typically be set to start four weeks (or other period of time) prior to the actual sale, and the presale ends immediately before the actual sale. By way of further example, if the event is a basketball game, the presale period may typically be set to start three months (or other period of time) prior to the actual sale, and the presale ends two weeks before the actual sale.

The period start may also be set, based at least in part, on historical sales statistics for a given event type, a performer, a team, a calendar period, etc. For example, the historical sales information can be retrieved from a storage location, such as an historical sales information database. A formula or algorithm, stored as executable code in computer readable memory, can be used to automatically calculate the presale start state relative to the actual sale start date, or a human can make presale start date determination.

For example, if a concert for a performer sold out in one day for a previous performance in a given city (indicating that there will be a high demand for tickets for the current event performance at issue), then the presale start date can be set to two months before the actual sale start day so that users will feel less pressure to quickly submit requests. By way of further example, if a concert for a performer sold out in three months for a previous performance in a given city, then the presale start date is set to one month before the actual sale start day, as it is less likely that there will be a large number of ticket requests in a short period of time. Thus, optionally, the start date can be dynamically determined based on historical sales patterns using information stored in computer readable memory. The presale start time can be selected based on other criteria as well.

Optionally, an initial presale end date may be extended up to the actual onsale date based on the number of submitted requests and/or the number of tickets requested during at least a portion of the initial presale window. Optionally, even after an initial presale window has ended, a new presale window may be established, with a start date after the end date of the initial presale window.

Optionally, all the available tickets are made available to presale requesters. Optionally, instead, only a subset of available tickets is made available to presale requesters. For example, a portion of seat tickets may be reserved for purchasers who submit requests during the onsale, as opposed to the presale, period. Optionally, the number of seats for which tickets are available during the presale is smaller than the number of seats for which tickets are available after the presale. Optionally, the number of seats for which tickets are available during the presale is larger than the number of seats for which tickets are available after the presale.

Optionally, a user may be permitted to cancel a presale request within a specified time period. For example the cancellation period may extend to the start of the actual sale, to a certain period of time after the user submitted the presale request, or a predetermined period of time before the actual sale starts. If the presale is setup so that a user can cancel a presale request, the user is informed of the cancellation guidelines and period via a presale Web page. Optionally, if the user cancels a request, the user is charged a fee as a result of the cancellation.

By way of example, users can be informed (e.g., via email, text messaging, a Web page hosted by the ticket same, print advertisement, etc.) of an upcoming event and provided information regarding one or more of the presale start date, the presale end date, the sale start date or the sale end date.

Using a browser or other interface executing on a terminal (e.g., a personal computer, a networked personal digital assistant, a networked television, a smart phone, etc.), a user can access a presale form via a ticket system Web page. The user may access the presale Web page via a landing page that lists presale events, via a specific presale page that lists presale events, by searching for the event via a search field, via a link provided to the user in an email, or otherwise. Optionally, the presale Web page can be provided online prior to the presale start date, with the page informing visitors of the presale start date, and without accepting presale requests.

The presale Web page can provide ticket request guidelines or rules. For example, the guidelines can specify a maximum number of tickets that a user can request for a given event, whether the user has to request an even number of tickets, etc. Optionally, the user may also be informed that the user will be required to provide payment information which will be used to pay for the tickets should the user be allocated tickets once the sale begins.

One or more fields may be provided via which the user can specify the number of tickets being requested, the price or price range of the requested tickets, and/or the desired seating section. Further, the user may optionally request that the user be allocated the best available seats. The user may optionally be provided with a field via which the user indicates that the user is willing to accept seats at a different cost or in a different location (e.g., a worse seating section).

The user may also be provided with an option of selecting one or more alternate related events (e.g., different performance dates for a play) in the event the user is not allocated tickets for the selected event. For example, three fields may be provided on the Web page, wherein the user is asked to select: a most preferred alternate event performance using a first field (e.g., by selecting from a set of listed performances displayed in a drop down or pop up menu); a second most preferred alternate event performance using a second field; a third most preferred alternate event performance using a third field. The user can optionally specify no alternative event performances, or less than three alternate event performances. Optionally, the user may be required to specify at least one alternate performance, if such is available.

The user selections are stored in a corresponding database which can be accessed when performing the seat allocation. Optionally, a field can be provided wherein the user can specify whether or not the user is willing to accept tickets for non-contiguous sets (e.g., seats spread out over more than one row or section, or seats within a single row, but wherein the seats are not contiguous).

Once the user has entered the requested information and selections, the user can activate a "submit" button. Optionally, an optical barrier (e.g., a word verification page) or other device may be provided to better prevent automated programs from submitting requests. Automated programs are less likely to be able to read the presented word and enter the word into the designated field.

Once the user enters the designated word into the field, the user activates a "continue" button. The ticket system verifies that the word was entered correctly, and if so, a delivery page is transmitted to the user terminal, the delivery Web page listing different delivery options and associated fees (if any). The user can select a desired delivery type (e.g., email, via a Web page, $2^{nd}$ day morning delivery, $2^{nd}$ day delivery, standard delivery, will call, etc.) by clicking on, or otherwise selecting the listed delivery type. Optionally, the system will calculate the total cost of the tickets, delivery fees, service fees, and the total of the foregoing, and will transmit the cost and fee information to the user via the user terminal for presentation to the user. The user can activate a submit button, and a payment page is presented to the user. The user may be asked to enter a credit card number, expiration date, a credit card identifier (CIN).

The Web page may further include user registration fields in which the user is to enter requested information, such as contact information (such as street addresses, city, state, zip code, email address, phone number, instant messaging identifier, etc.), user identifier, desired password, etc., or account log in information (e.g., a password and/or a user identifier). Optionally, the user will be presented with another optical barrier Web page.

Optionally, the ticket system checks to make sure a delivery type was selected, verify the credit card number, expiration date, and CIN, and determine if the optical barrier entry from the user is correct. If an error occurs with respect to the foregoing, the user is optionally asked to provide or correct the corresponding information. If the user fails to correct the errors or provides a cancel instruction (e.g., via a cancel button, by not responding, by logging out, or otherwise), or otherwise does not complete the form, the user's request is optionally rejected, and tickets will not be allocated based on the request.

Optionally, the user is not required to provide payment, payment information and/or shipping information until after tickets have been allocated to the user. Optionally, instead, the user is charged for the requested tickets even before the tickets have been allocated to the user, and the charge is cancelled or the user is credited the charged amount in the event the user is not allocated the requested tickets.

Once the presale period is closed for the tickets at issue, the ticket system does not accept additional presale ticket requests for those tickets, unless a new presale window is established.

Once the tickets are available for allocation (e.g., once an actual sale period has started or other time period), the tickets can be allocated using a batch process. Optionally, the allocation process can be performed when ticket system computers are lightly loaded (e.g., at night, when access by users tends to be low) or upon the occurrence of a selected event. The batch processing may be performed, by way of example, immediately after the end of the presale, 1, 2, 6, 12, 24, 36, or other specified number of hours after the end of (or the beginning of) the presale, or other time period. Optionally, general tickets sales via the ticket system website are restricted or not allowed, until the batch process of allocating tickets to the presale requesters is complete. For example, the batch allocation process can be performed from 2:00 AM to 4:00 AM on a given day, and the general sale of tickets to other users is later initiated at 8:00 AM that day.

As similarly discussed above, the allocation process to presale requesters can be based on one or more criteria. For example, the ticket system is optionally programmed to allocate to a user requesting more than one ticket, tickets for contiguous seats, to avoid the user's group being split up among over multiple rows and/or sections. Hence, in order to avoid empty seats that might result from an inability to fit a user's group into the empty seats, the ticket system optionally allocates tickets, taking into account the number of tickets being requested for each of several users, and assigns seats and allocates tickets so as to keep groups together in contiguous seats, while also reducing or minimizing unfilled seats. For example, users requesting a smaller, even number of tickets (e.g., 2 tickets) are optionally allocated tickets before users requesting a larger number of tickets (e.g., 3 or more tickets). By way of further example, users requesting an even number of tickets are optionally allocated tickets before those requesting an odd number of tickets.

By way of further example, preference may be given to requesting users based, at least in part, on their location or their distance from a venue or other designated area. For example, tickets may be allocated to users based, at least in part, on their mailing and/or billing zip codes, where users in a certain set of zip codes (e.g., zip codes for areas closer to the event venue) are allocated tickets before those in other zip codes. By way of further example, optionally, the best seat ticket(s) can be allocated to the user that is closet to the event venue, the second best seat ticket(s) can be allocated to the user that is the second closet to the event venue, and so on until either all the seats in the relevant set of seats are allocated, or until all requesting users have been allocated tickets.

By way of still further example, tickets may be allocated based on whether the user has purchased a ticket via the ticket system within a certain period of time. For example, in order to encourage ticket requesters that have not recently utilized the ticket system to utilize the ticket system with greater frequency, those users that have not ordered and/or requested tickets via the ticket system within a selected period of time (e.g., 6 months or 1 year), may be allocated tickets before those users that have utilized the system more frequently. By way of further example, optionally, the best seat ticket(s) can be allocated to the user that that have never previously utilized the ticket service, the second best seat ticket(s) can be allocated to the user for which the most time has elapsed since the user previously utilized the ticket system, and so on until either all the seats in the relevant set of seats are allocated, or until all requesting users have been allocated tickets. Optionally, ties (e.g., two users that have the same elapsed time since their last previous use), can be broken based on one or more other criteria, such as the number of tickets requested, the users' locations, the frequency of a user's ticket purchases, one or more of the other criteria discussed herein, etc.

By way of yet further example, tickets may be allocated based on the frequency with which a user has purchased tickets via the ticket system. For example, in order to reward frequent ticket purchaser, the greater the user ticket purchase frequency, the higher priority the user will have in being allocated tickets. Optionally, ties (e.g., two users that have the same elapsed time since their last previous use), can be broken based on one or more other criteria, such as the number of tickets requested, the users' locations, one or more of the other criteria discussed herein, etc.

By way of illustration, once the presale has closed (e.g., during the batch processing), the user requests can be ranked or ordered based on one or more of the foregoing criteria. For example, the user requests can first be ranked or ordered based on the quantity of seats being requested. For those user requests that are assigned the same ranking or position in an ordering, those requests can be re-ranked or re-ordered based on other criteria, such as the user location. Similarly, for those users that have the same ranking or ordering after the first re-ranking, a further re-ranking or re-ordering can be performed based on still additional criteria (e.g., the frequency of ticket purchases), and so on. Thus, one, two, three, four, five, six or more criteria can be used to rank and/or re-rank ticket requests.

Optionally, to the extent that certain requests still have the same ranking, a "tied" request can randomly or alphabetically (e.g., based on the user last and/or first name) be assigned a higher or lower ranking relative to another tied request so that each user request has a unique ranking. Optionally, when there is a "tied" request, the user that submitted the ticket request first is given a higher ranking. Tickets (associated with corresponding reserved seats if the event is not a general admission event) are then allocated to the users based at least in part on the request rankings. For example, the highest ranked user request (e.g., for a given user specified price and/or section) can be assigned the best available (e.g., the estimated most preferred) seats within the price and/or section category specified by the user. The next highest ranked user request can be assigned the second best available seats, etc. Thus, in addition to the user requests being ranked or ordered, some or all of the venue seats are optionally ranked or ordered based, at least in part, or the perceived to expected desirability of the seats. The seat ticket allocations are optionally therefore based on both ticket request rankings or order, and seat rankings or order.

After the ticket assignments have been performed, the users assigned tickets can have their payment information verified to determine if it (e.g., a credit card or charge card) is still valid (e.g., by check with the credit card issuer or agent). If a user's payment mechanism is declined or otherwise cannot be used, optionally, the user may be informed of the problem and/or asked for an alternative payment mechanism within a specified period of time. If the user fails to do so, the user is not allocated a ticket and the next higher ranked user request having matching seat criteria is allocated the seat tickets that had previously been assigned to the user's whose payment mechanism has been declined.

Optionally, instead, if a user's payment mechanism is declined or otherwise cannot be used, that user is not asked to provide an alternative form of payment, and instead the user's request is removed from the queue without such a request. Then, as similarly discussed above, a re-ranking is performed without the now removed user request (e.g., the next higher ranked user request having the same seat criteria, such as the same number of seat tickets, at the same cost level, is allocated the seat tickets that had previously been assigned to the user's whose payment mechanism has been declined). Further, rather than assigning the tickets to the next highest ranking matching user request, user requests can be re-ranked, and the allocation process can be based on the re-ranking.

After a user's payment mechanism has been validated (or after a set of users have had their payment mechanisms validated), the user's payment mechanism is charged for the tickets, as well as associated service and delivery fees, the user is notified of the charge and/or the ticket allocation (e.g., the user is informed that the user has been allocated a ticket, the seats, if any, the user has been allocated, the ticket amount, related taxes and service fees, the total transaction cost, etc., via email, a Web page, an SMS message, an AIM (AOL® Instant Messenger) message, Apple iChat audio/video message, other instant message, or otherwise), and the ticket is delivered to the user in accordance with the user's earlier instructions.

Figure 1B:
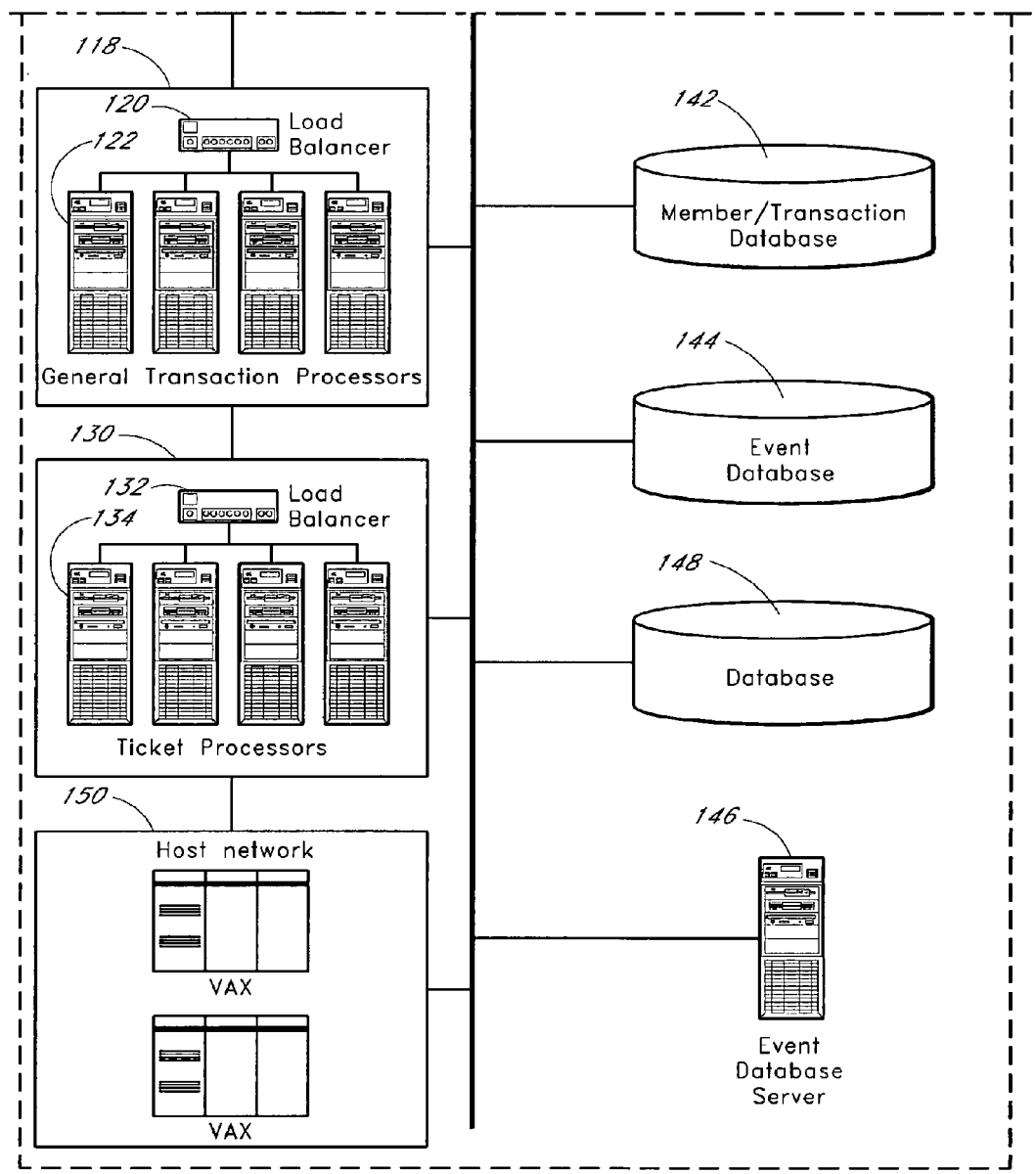

Example embodiments will now be discussed with reference to the figures. FIG. 1, including FIGS. 1A-B, illustrates an example embodiment that can be used in conjunction with the processes described herein. Not all of the illustrated systems and components need to be included in the ticketing system, and other systems and architectures can be used as well. With reference to FIG. 1, a user terminal 102 is coupled to an example ticket system 104 over the Internet 105 using HTTP/HTTPS or other protocol. An example web proxy system 106 includes an optional load balancer 108 and web proxy processors 110, and can selectively block or route an inbound request from a user browser executing on the terminal 102 to an appropriate internal destination, (e.g., a queue or other destination server).

The illustrated example ticket system 104 includes example Web application system 112, which includes an optional load balancer 114 and Web application processors 116. A general transaction system 118 includes an optional load balancer 120 and transaction processors 122 that are used to generate transactional pages, populate data caches, provide logic and/or rules for the transaction flows, and to sequence requests. A cache cluster system 124 includes an optional load balancer 126 and processors 128. The cache cluster system 124 caches data and states for quick access by other system components.

An example ticket processor system 130 is provided that includes an optional load balancer 132 and processors 134. The example ticket processors 134 conduct and/or manage the event ticketing, perform batch processing of ticket requests, keep track of tickets being sold, the status of presales and sales, the current ticket requesters or purchasers, the number of seat tickets being requested by corresponding ticket requesters, the price, section, and/or location of the requested seats, whether a given ticket requester is willing to accept tickets for an alternative performance, the requesting ticket delivery methods, the number of seats being offered during the presale and sale, ticket prices, and so on. A session cluster system 136 includes an optional load balancer 138 and a plurality of processors 140 and is used to manage sessions.

A member transaction repository database 142 stores user contact information, billing information, preferences, account status, and the like, that can be accessed by other portions of the ticket system 104. The database 142 can also store a user opt-in for notifications regarding tickets (e.g., whether the user was allocated a ticket during the batch allocation process).

An event database 144 stores information regarding events, including, by way of example, the venue, artist, date, time, additional performances, and the like. The event database 144 or a separate database includes ticket information records, including one or more of barcode information, event name, event date, seat identifier, ticket holder name or other identifier of a current ticket holder, names or other identifiers of past holders of the ticket, a ticket valid/invalid indicator, and/or an indicator that as to whether the ticket has been used. The database 144, or another database, can also store information regarding a presale beginning date, a presale end date, an onsale beginning date, an onsale end date, the maximum quantity of Units a user can request or purchase, and so on.

An event database server 146 is used to provide event database access to other portions of the ticket system.

An example database 148 is provided that stores historical event information (e.g., of events that have already taken place), such as historical information regarding events, optionally including the event date, the event type, the identity of the performer/team, the event venue, the event presale start date (if there was a presale), the event presale end date, information relating to the number of requesters per day for each day of the presale, the total number of tickets assigned to presale requesters, the total number of tickets made available to presale ticket requesters, the event onsale start date, the event onsale end date, information relating to the number of ticket purchases per day for each day of the onsale, the total number of tickets sold during the onsale period, the total number of event tickets offered for sale during the onsale period, as well as other optional information. Optionally, some or all of the foregoing information can be used in setting presale start and end dates for future events, as well as sale start and end dates.

A host network system 150 is also optionally provided.

Figure 2:
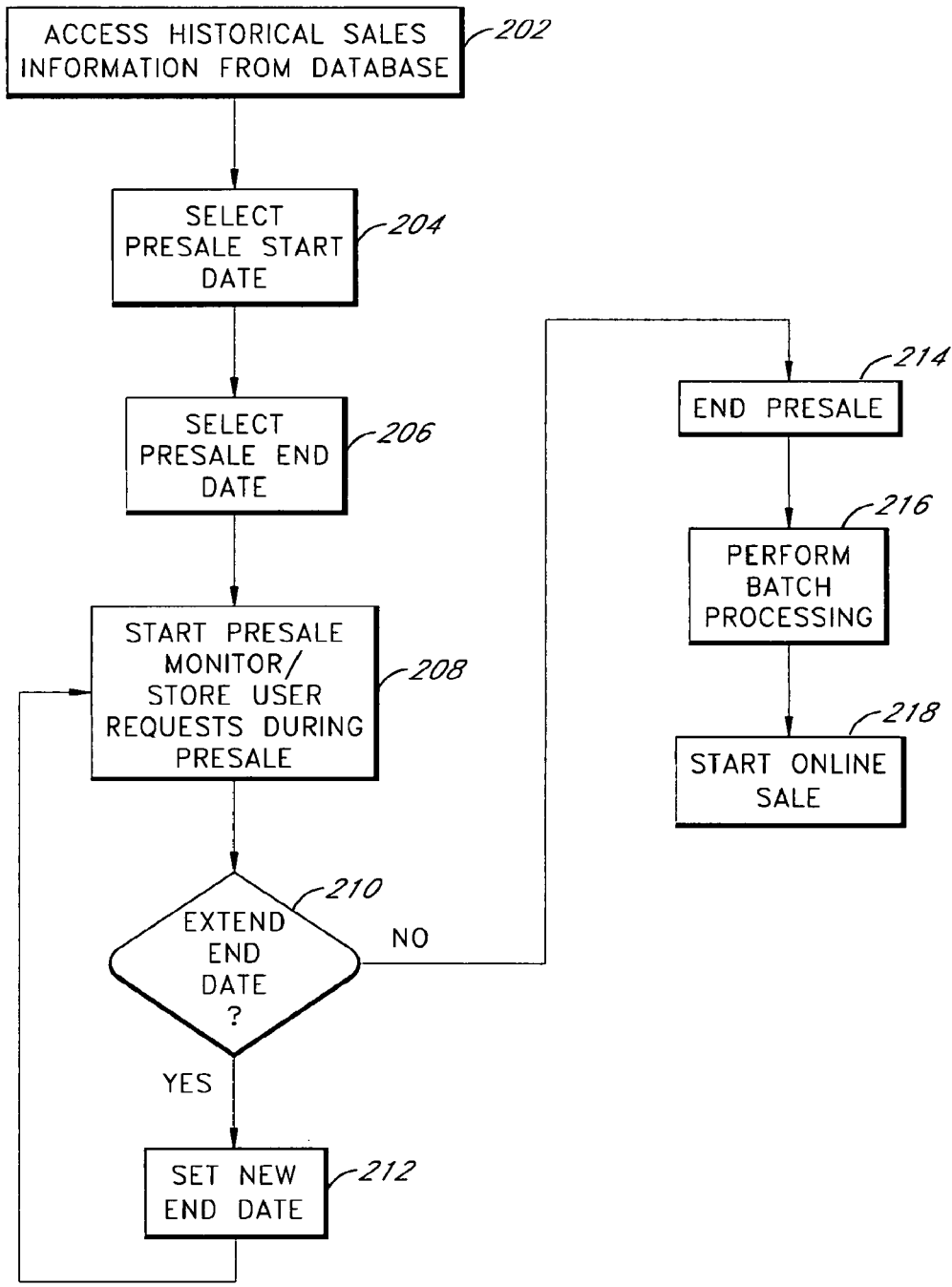
FIG. 2 illustrates an example resource allocation process, including batch allocation.

FIG. 2 illustrates an example resource allocation process, including batch allocation. At state 202, historical information regarding previous events is retrieved from a database. For example, information regarding one or more events that have already occurred can be retrieved, including some or all of the following information: event date, event type (e.g., sports event, musical event, travel event, etc.), identity of the performer/team (if applicable), event venue, event presale start date (if there was a presale), event presale end date, information relating to the number of requesters per day for each day of the presale, total number of tickets assigned to presale requesters, total number of tickets made available to presale ticket requesters, event onsale start date, event onsale end date, information relating to the number of ticket purchases per day for each day of the onsale, total number of tickets sold during the onsale period, total number of event tickets offered for sale during the onsale period, etc.

At state 204, some or all of the information retrieved at state 202 is used to automatically select a presale start date (which can be manually modified). At state 206, some or all of the information retrieved at state 202 is used to automatically select a presale end date (which can be manually modified). Optionally, instead, the presale end date can be set to end at, or about, the beginning of the onsale process.

At state 208, the presale begins. The system receives presale ticket requests via online forms (e.g., accessed via user terminals), a kiosk, or other user interface (e.g., via a phone system, such as an interactive voice response system or via a human in a call center), and stores the requests and related information in a database. Users may be requested to provide some or all of the following information: the number of tickets being requested, the price or price range of the requested tickets, the desired seating section (including "the best available seats" as an option), acceptable alternate performances, and whether the user is willing to accept tickets for non-contiguous seats. Because the tickets are not yet on sale, in some circumstances, the ticket price may not have been finalized. Therefore, the user may be advised that the final price of a ticket may be different than that displayed by the system and requested to approve a ticket charge within a price range. For example, the user may be informed that a ticket price will have a final price within the range of $35-$42 and the user may be asked to provide acceptance for such ticket price range. The user's acceptance or refusal is stored in memory.

The system optionally monitors the total number of requests at a given point in time, the rate of requests, the number of seats being requested, and/or the time the requests are being submitted. At state 210, which can be performed in parallel with state 208, a determination is optionally made as to whether the presale start date should be extended or altered based on some or all of the monitored request related information. For example, if ticket requests are being received at a slower than expected rate, the system can extend the presale end date to enable more users to request tickets during the presale window. If a decision has been made to extend the end date, the process proceeds to state 212, and a new presale end date is set. The process the proceeds from state 212 to state 208, and additional presale ticket requests are received.

The ticket presale ends at state 214. At state 216, batch processing is performed on the ticket requests as described herein, and those users that are allocated tickets are charged, and the tickets are delivered. For example, the tickets can be downloaded over the network to the user terminal from the ticketing website and printed by the user; sent as an email attachment or embedded in an email, transmitted to a mobile phone, stored in a smart card (e.g., a pocket size or substantially credit card sized card that includes processor and can store certain information in a tamper-resistant manner), or otherwise provided. The tickets (whether in a hardcopy form or stored electronically) can include scannable barcode information and/or have human readable indicia indicating the event name, event date/time, one or more seat numbers (e.g., for a reserved seat event), a ticket recipient name, and/or other information. At state 218, the online sale begins for the now available tickets. Thus, users can now purchase tickets in substantially real time (as opposed to in a batch process) via the ticket system Web site, kiosks, or otherwise. Optionally, states 216 and 218 are performed at least partially in parallel, or are performed serially.

Figure 3:
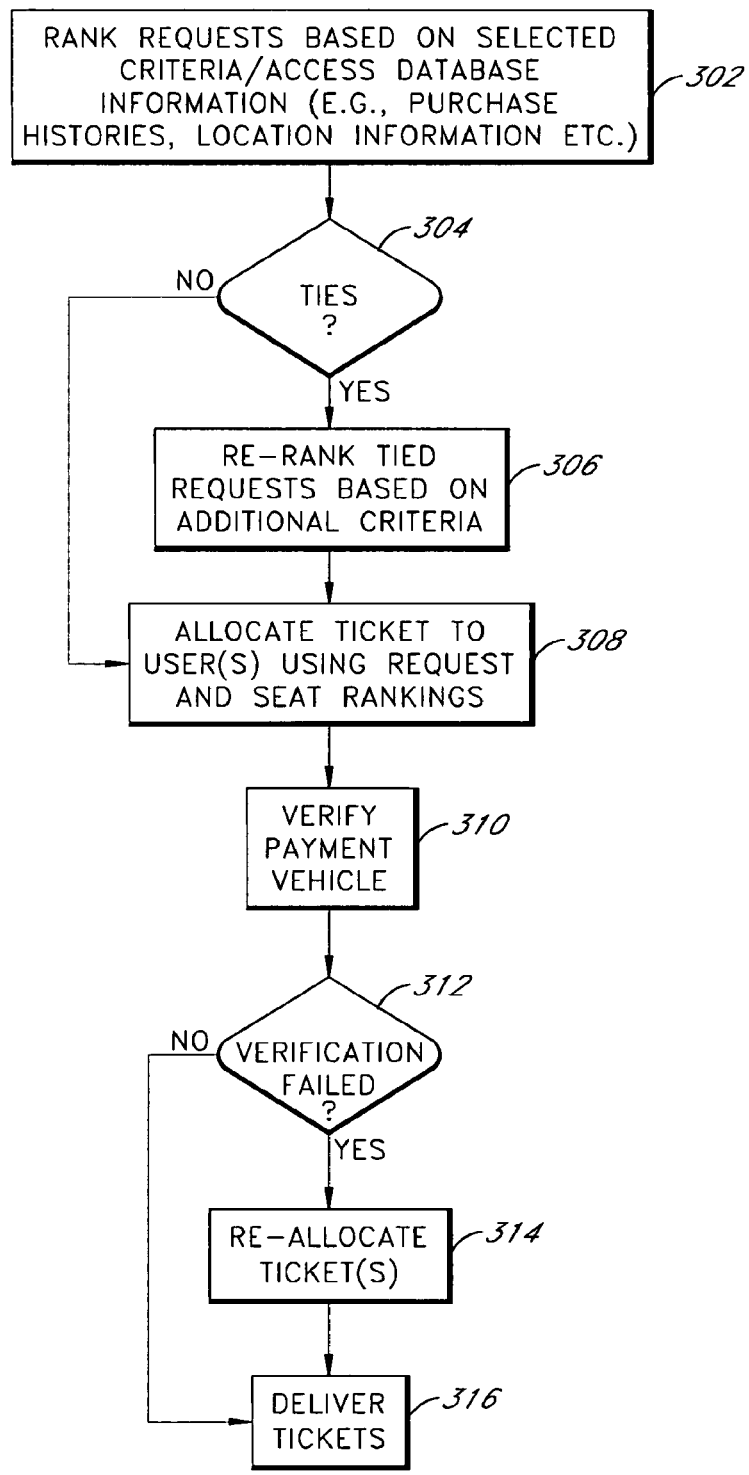
FIG. 3 illustrates an example resource allocation batch process.

FIG. 3 illustrates an example resource request batch process. By way of example, the illustrated batch process can be performed at state 216, illustrated in FIG. 2. At state 302, user requests are retrieved from a database and ranked or ordered based on one or more criteria, such as the example criteria discussed herein (user location, purchase histories, membership in a preferred group or affiliate, etc.). At state 304, a determination is made as to whether there are user requests that have been given the same ranking. At state 306, user requests that have the same ranking are optionally re-ranked or ordered based on additional criteria, such as one or more of the criteria discussed herein. At state 308, seat tickets are allocated to users based on their associated ranking and the seat ranking (e.g., those users with better rankings are optionally allocated seats with better rankings, as compared to users with worse rankings).

At state 310, a verification is performed as to whether a given user's payment vehicle can be used to pay for the ticket purchase (e.g., if the payment vehicle is a credit card, a determination is optionally made as to whether the credit card code is valid, whether the credit card has expired, whether the credit card had its credit limit exceeded, and/or whether the credit card charge has been denied).

At state 314, if the payment verification failed for a user, the user's allocated seat tickets are allocated to another user. For example, optionally all the user requests can be re-ranked, and a re-allocation of seat tickets performed, without including the user whose payment verification failed. Optionally, instead, only a portion of the user requests (e.g., those with a lower ranking than the removed user) are re-ranked, and a re-allocation of seat tickets performed, without including the user whose payment verification failed. Users who were allocated seats, and whose payment vehicles were verified, are charged for the allocated tickets and associated service and delivery fees. At state 316, the tickets are delivered to users in accordance with user instructions retrieved from a database. Optionally, the payment vehicle verification is performed prior to state 302, so that user requests can be removed prior to the initial ranking process if the verification failed.

Figure 4:
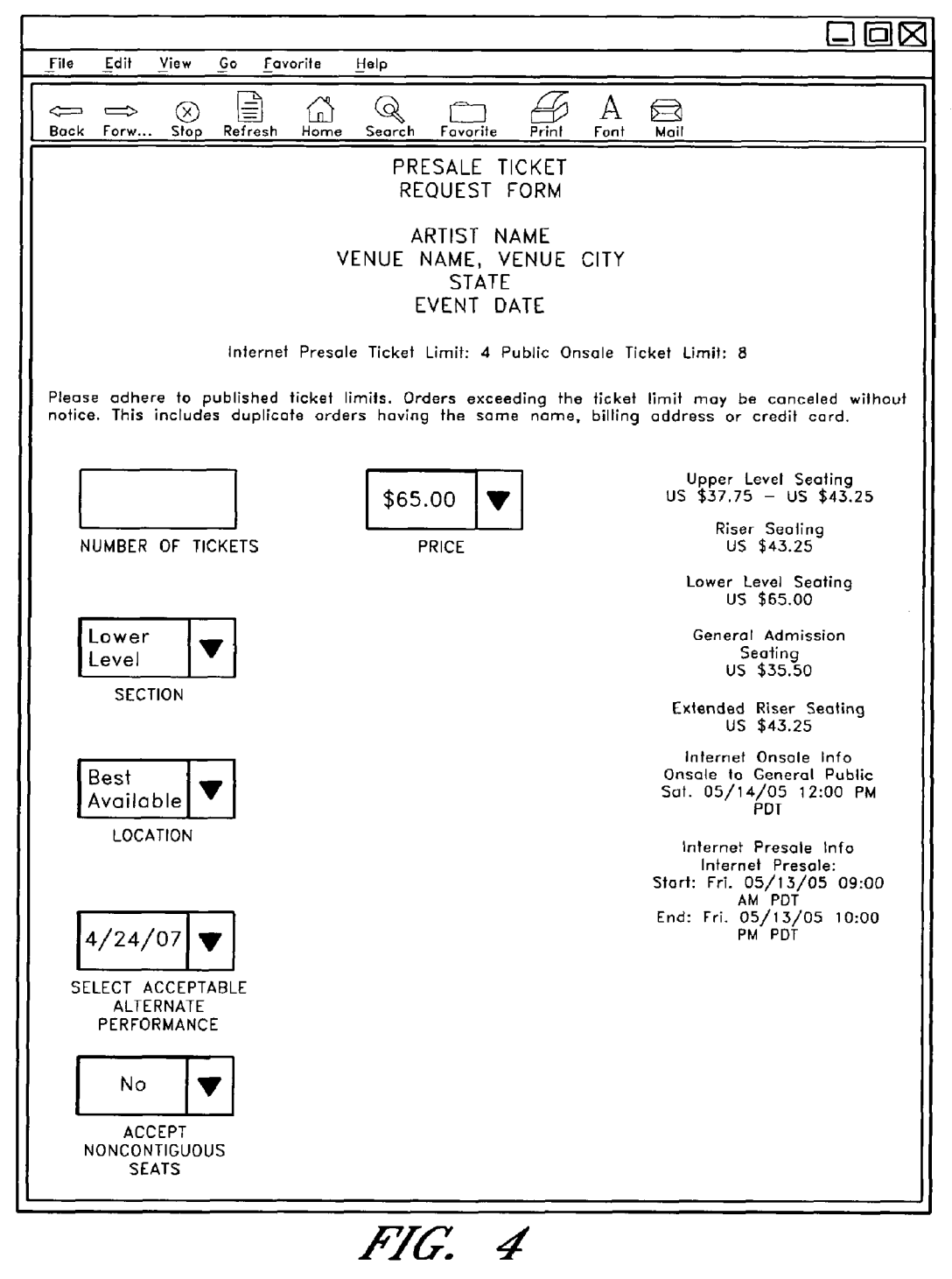

FIG. 4 illustrates an example presale ticket request form, although forms having fewer, more, or different fields can be used as well. The example presale request form includes information regarding the event for which tickets are being requested. For example, the artist/performer/sports team name, the venue name, the venue location, and the event date are optionally presented. In addition, the ticket prices (or estimated price range) for available sections or seating areas are presented. Some or all of the following fields are provided, via which the user can provide entries via a drop down menu, by typing values into the fields, or otherwise: a number of tickets field (wherein the user can designate the number of seat tickets the user is requesting), a price range field (wherein the user can designate the price range of the seat tickets the user is requesting), a section field, a location field, an alternative performance selection performance field (wherein the user can select an alternate performance date or an alternate event, should the user not be allocated a ticket for the event at issue), and/or an accept noncontiguous seats field (wherein the user can indicate that the user is willing to accept noncontiguous seat assignments). The selections and information provided by the user via the form is stored in a database in association with a user and/or session identifier. The information can later be retrieved by the system for ticket seat allocation.

FIG. 5 illustrates an example form used to select a ticket delivery method. For example, the user can optionally specify that the tickets are to be delivered via email, via a Web page, via expedited delivery (e.g., overnight, two day, or Saturday delivery), or via will call (e.g., where the user picks up the tickets at the box office on the show date). Optionally, a fee is charged for certain delivery methods. The example form illustrated in FIG. 4 presents the current total ticket cost, shipping cost, service and handling fee, and overall total cost for the tickets and delivery method requested by the user. The user optionally can click on a "recalculate" button, and in response, the system may recalculate the foregoing costs and fees, and cause the recalculated costs and fees to be presented on the form or other user interface.

Figure 6:
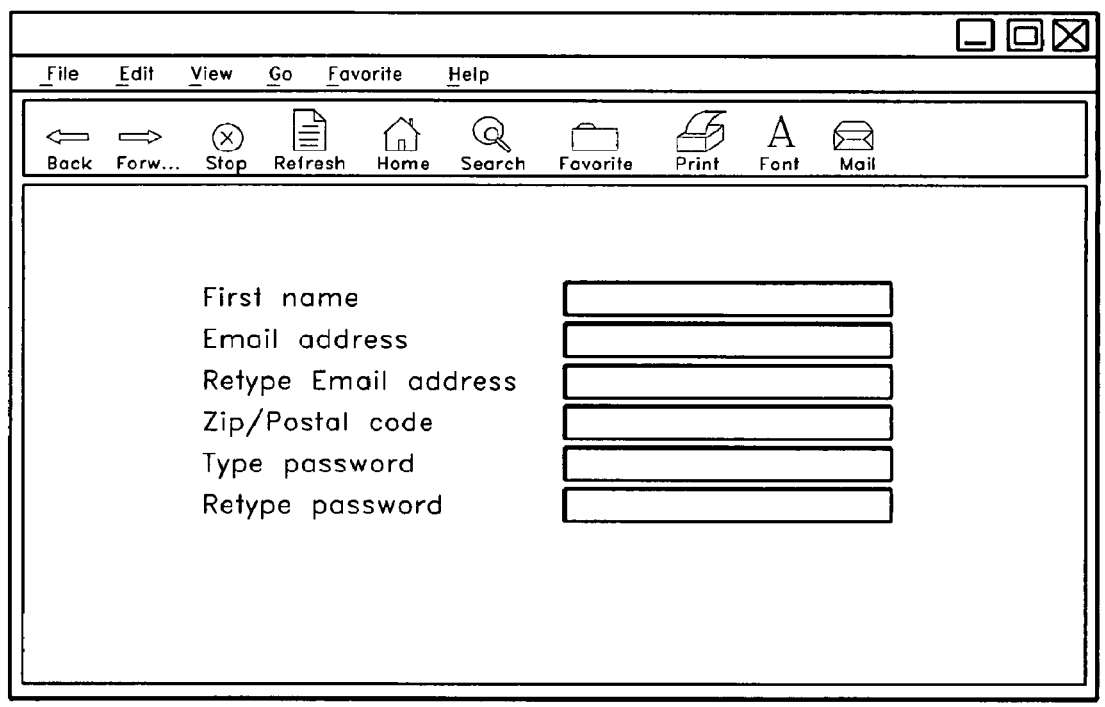
FIG. 6 a log in user interface.

FIG. 6 illustrates an example user log-in form which requests that the user enter their first name, email address, zip code, and password. The foregoing information can be used to access user account information from a database and to store user ticket requests and other information in the database in association with a user identifier.

Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with, or substituted for one another in order to form varying modes of the disclosed invention. Thus, it is intended that the scope of the present invention herein disclosed should not be limited by the particular disclosed embodiments described above.

What is claimed is:

1. A method of performing delayed allocations of electronic tickets via a computer system, the method comprising:
   transmitting over a network to a first terminal associated with a user information regarding a first time period when ticket requests for a first event will be accepted, wherein an electronic ticket for the first event provides one or more people with event access;
   receiving a first plurality of electronic ticket requests over the network from a first plurality of users during the first time period, wherein electronic ticket requests in the first plurality of electronic ticket requests are for electronic tickets at a set price;
   processing the first plurality of electronic ticket requests using the computer system during a second time period, wherein the second time period begins after the first plurality of electronic ticket requests has been received;
   transforming, by the computer system, electronic ticket requests in the first plurality of electronic ticket requests into a queue, the transformation including ranking the electronic ticket requests based on a quantity of event seating currently being requested by one or more users requesting electronic tickets;
   monitoring a load variable indicative of a quantity of ticket requests being received at the network;
   determining that a burst load condition is satisfied based on the load variable;
   in response to determining that the burst load condition is satisfied, allocating electronic tickets to at least a portion of the plurality users based at least in part on corresponding electronic ticket request rankings in the queue; and
   transmitting a communication to one or more users allocated a requested electronic ticket.

2. The method as defined in claim 1, wherein the ranking is further based at least in part on one the following criteria:
   a location of one or more users requesting electronic tickets;
   quantity of previous tickets purchased by one or more users requesting electronic tickets;
   value of electronic ticket purchases made by one or more users requesting electronic tickets;
   information related to a resale of electronic tickets by one or more users requesting the quantity of event seating currently being requested by one or more users requesting electronic tickets; and
   whether one or more users are requesting an odd number of event seats.

3. The method as defined in claim 1, wherein the ranking is further based at least in part on a location of one or more users requesting electronic tickets.

4. The method as defined in claim 1, wherein the ranking is further based at least in part on whether one or more users are requesting an odd number of event seats.

5. The method as defined in claim 1, the method further comprising providing over the network a form including a field for indicating an acceptable alternate event.

6. The method as defined in claim 1, the method further comprising providing over the network a form to the first terminal including a field for indicating whether the user is willing to accept electronic tickets for non-contiguous seats.

7. The method as defined in claim 1, wherein the second time period begins at least twelve hours after the first time period begins.

8. The method as defined in claim 1, wherein the first plurality of users are designated as eligible to submit electronic ticket requests during the first time period based at least in part on a first common characteristic, and a second plurality of users without the first common characteristic are not eligible to submit electronic ticket requests during the first time period, and wherein the second plurality of users are eligible to submit electronic ticket requests during a third time period that begins after the first time period begins.

9. The method as defined in claim 1, wherein the first plurality of users are designated as eligible to submit electronic ticket requests during the first time period based at least in part on a first common characteristic, and a second plurality of users without the first common characteristic are not eligible to submit electronic ticket requests during the first time period, wherein the first common characteristic is a membership in a first organization associated with a performer scheduled to perform at the first event.

10. The method as defined in claim 1, wherein the first plurality of users are designated as eligible to submit electronic ticket requests during the first time period based at least in part on a first common characteristic, and a second plurality of users without the first common characteristic are not eligible to submit electronic ticket requests during the first time period, wherein the first common characteristic is being holder of a credit card issued by a first organization.

11. The method as defined in claim 1, the method further comprising assigning a better ranking to a request requesting an electronic ticket for an even number of seats than a request requesting an electronic ticket for an odd number of seats.

12. The method as defined in claim 1, the method further comprising assigning a better ranking to a request requesting an electronic ticket for relatively fewer seats than a request requesting an electronic ticket for a relatively larger number of seats.

13. The method as defined in claim 1, the method further comprising assigning a better ranking to a request associated with a user that has purchased at least one ticket relatively more recently than a request associated with a user that has not purchased at least one ticket as recently.

14. The method as defined in claim 1, wherein the first time period is selected based at least in part on an event-type.

15. The method as defined in claim 1, the method further comprising:
receiving during a third time period an electronic ticket request for the first event; and
processing and allocating at least one electronic ticket to the electronic ticket request received during the third time period in substantially real-time.

16. A system comprising:
one or more computing devices;
a non-transitory computer readable medium storing instructions that when executed by the one or more computing devices are configured to cause the system to perform operations comprising:
transmitting over a network to a first terminal associated with a user information regarding a first time period when electronic ticket requests for a first event will be accepted, wherein an electronic ticket for the first event provides one or more people with event access;
receiving a first plurality of electronic ticket requests over the network from a first plurality of users during the first time period, wherein electronic ticket requests in the first plurality of electronic ticket requests are for electronic tickets at a set price;
transforming, by the computer system, electronic ticket requests in the first plurality of electronic ticket requests into a queue, the transformation including ranking the ticket requests based on a quantity of event seating currently being requested by one or more users requesting electronic tickets;
monitoring a load variable indicative of a quantity of ticket requests being received at the network;
determining that a burst load condition is satisfied based on the load variable;
in response to determining that the burst load condition is satisfied, allocating, during a second time period, wherein the second time period begins after the first plurality of electronic ticket requests has been received, electronic tickets to at least a portion of the plurality users based at least in part on corresponding electronic ticket request rankings in the queue; and
transmitting a communication to one or more users allocated a requested electronic ticket.

17. The system as defined in claim 16, wherein the ranking is further based at least in part on one the following criteria:
a location of one or more users requesting electronic tickets;
quantity of previous tickets purchased by one or more users requesting electronic tickets;
value of ticket purchases made by one or more users requesting electronic tickets;
information related to a resale of electronic tickets by one or more users requesting the quantity of event seating currently being requested by one or more users requesting tickets; and
whether one or more users are requesting an odd number of event seats.

18. The system as defined in claim 16, wherein the ranking is further based at least in part on a location of one or more users requesting tickets.

19. The system as defined in claim 16, wherein the ranking is further based at least in part on whether one or more users are requesting an odd number of event seats.

20. The system as defined in claim 16, the operations further comprising distributing at least one allocated electronic ticket via a mobile phone.

21. The system as defined in claim 16, the operations further comprising distributing at least one allocated electronic ticket for printing to at least one user terminal.

22. The system as defined in claim 16, the operations further comprising distributing at least one allocated electronic ticket via a smart card.

23. The system as defined in claim 16, the operations further comprising providing over the network a form including a field for indicating an acceptable alternate event.

24. The system as defined in claim 16, the operations further comprising providing over the network a form to the first terminal including a field for indicating whether the user is willing to accept electronic tickets for non-contiguous seats.

25. The system as defined in claim 16, wherein the second time period begins after the first time period ends.

26. The system as defined in claim 16, wherein the second time period begins at least twelve hours after the first time period begins.

27. The system as defined in claim 16, wherein the first plurality of users are designated as eligible to submit electronic ticket requests during the first time period based at least in part on a first common characteristic, and a second plurality of users without the first common characteristic are not eligible to submit electronic ticket requests during the first time period, and wherein the second plurality of users are eligible to submit electronic ticket requests during a third time period that begins after the first time period begins and before the first time period ends.

28. The system as defined in claim 16, wherein the first plurality of users are designated as eligible to submit electronic ticket requests during the first time period based at least in part on a first common characteristic, and a second plurality of users without the first common characteristic are not eligible to submit electronic ticket requests during the first time period, and wherein the second plurality of users are eligible to submit electronic ticket requests during a third time period that begins after the first time period ends.

29. The system as defined in claim 16, wherein the first plurality of users are designated as eligible to submit electronic ticket requests during the first time period based at least in part on a first common characteristic, and a second plurality of users without the first common characteristic are not eligible to submit electronic ticket requests during the first time period, wherein the first common characteristic is a membership in a first organization.

30. The system as defined in claim 16, wherein the first plurality of users are designated as eligible to submit electronic ticket requests during the first time period based at least in part on a first common characteristic, and a second plurality of users without the first common characteristic are not eligible to submit electronic ticket requests during the first time period, wherein the first common characteristic is a membership in a first organization associated with a performer scheduled to perform at the first event.

31. The system as defined in claim 16, wherein the first plurality of users are designated as eligible to submit electronic ticket requests during the first time period based at least in part on a first common characteristic, and a second plurality of users without the first common characteristic are not eligible to submit electronic ticket requests during the first time period, wherein the first common characteristic is being holder of a credit card issued by a first organization.

32. The system as defined in claim 16, the operations further comprising assigning a better ranking to a request requesting an electronic ticket for an even number of seats than a request requesting an electronic ticket for an odd number of seats.

33. The system as defined in claim 16, the operations further comprising assigning a better ranking to a request requesting an electronic ticket for relatively fewer seats than a request requesting an electronic ticket for a relatively larger number of seats.

34. The system as defined in claim 16, the operations further comprising assigning a better ranking to a request associated with a user that has a greater frequency of electronic ticket purchases than a request associated with a user that has a relatively lower frequency of electronic ticket purchases.

35. The system as defined in claim 16, the operations further comprising assigning a better ranking to an electronic request associated with a user that has purchased at least one ticket relatively more recently than an electronic request associated with a user that has not purchased at least one ticket as recently.

36. The system as defined in claim 16, wherein the ranking of the first plurality of electronic ticket requests is further based at least in part on at least one requested electronic ticket's quality.

37. The system as defined in claim 16, the operations further comprising extending the first time period from an initial length based at least in part on how many electronic ticket requests were received during at least a first portion of the first time period and/or how many seats were requested during at least a second portion of the first time period.

38. The system as defined in claim 16, the operations further comprising:
   determining that at least two electronic ticket requests have been assigned the same ranking; and
   using one or more criteria to re-rank at least one of the at least two electronic ticket requests.

39. The system as defined in claim 16, the operations further comprising determining that at least one form of payment proffered in association with at least one electronic ticket request has been declined or is not valid, and re-ranking at least one other electronic ticket request at least partly in response.

40. The system as defined in claim 16, wherein the first time period is selected based at least in part on an event-type.

41. The system as defined in claim 16, wherein the second time period is longer than the first time period.

42. The system as defined in claim 16, wherein only a first portion of the first event seating is available to be allocated to electronic ticket requests received during the first time period, and a second portion of the first event seating is available to be allocated to electronic ticket requests received during a third time period.

43. The system as defined in claim 16, where only users in a first set of users are eligible to submit electronic ticket requests during the first time period, and users in a second set of users are eligible to submit electronic ticket requests at a later time, wherein the second set of users is larger than the first set of users, and the second set of users includes at least a portion of the first set of users.

44. The system as defined in claim 16, the operations further comprising:
   receiving during a third time period an electronic ticket request for the first event; and
   processing the electronic ticket request received during the third time period in substantially real-time.

45. A system comprising:
   one or more computing devices;
   a non-transitory computer readable medium storing instructions that when executed by the one or more computing devices are configured to cause the system to perform operations comprising:
   receiving a first plurality of electronic ticket requests over a network, at a computer system, from a first plurality of users during a first time period;
   transforming, by the computer system the first plurality of electronic ticket requests into a queue, the transformation including ranking the electronic ticket requests for set price electronic tickets based on a quantity of event seating currently being requested by one or more users requesting electronic tickets;
   monitoring a load variable indicative of a quantity of ticket requests being received at the network;
   determining that a burst load condition is satisfied based on the load variable;
   in response to determining that the burst load condition is satisfied, allocating, by the computer system, electronic tickets to at least a portion of the plurality users based at least in part on corresponding electronic ticket request rankings in the queue; and
   transmitting a communication to one or more users allocated a requested electronic ticket;
   wherein the ranking of the first plurality of electronic ticket requests is performed, at least in part, during a second time period, wherein the second time period begins after the first plurality of electronic ticket requests has been received.

46. The system as defined in claim 45, wherein the ranking is further based at least in part on one the following criteria:
a location of one or more users requesting tickets;
quantity of previous tickets purchased by one or more users requesting electronic tickets;
value of ticket purchases made by one or more users requesting electronic tickets;
information related to a resale of electronic tickets by one or more users requesting the quantity of event seating currently being requested by one or more users requesting electronic tickets;
whether one or more users are requesting an odd number of event seats.

47. The system as defined in claim 45, wherein electronic ticket requests in the first plurality of electronic ticket requests are ranked based at least in part on a location of one or more users requesting tickets.

48. The system as defined in claim 45, wherein electronic ticket requests in the first plurality of electronic ticket requests are ranked based at least in part on whether one or more users are requesting an odd number of event seats.

49. The system as defined in claim 45, the method further comprising providing over the network a form including a field for indicating an acceptable alternate event.

50. The system as defined in claim 45, the method further comprising providing over the network a form to the first terminal including a field for indicating whether the user is willing to accept electronic tickets for non-contiguous seats.

* * * * *